(12) United States Patent
Jeon et al.

(10) Patent No.: US 10,921,438 B2
(45) Date of Patent: Feb. 16, 2021

(54) POSITION DETERMINATION METHOD AND DEVICE

(71) Applicant: Samsung Electronics Co., Ltd., Gyeonggi-do (KR)

(72) Inventors: Jae Woong Jeon, Gyeonggi-do (KR); Dong Hun Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 227 days.

(21) Appl. No.: 16/083,786

(22) PCT Filed: Feb. 23, 2017

(86) PCT No.: PCT/KR2017/002009
§ 371 (c)(1),
(2) Date: Sep. 10, 2018

(87) PCT Pub. No.: WO2017/155231
PCT Pub. Date: Sep. 14, 2017

(65) Prior Publication Data
US 2019/0072661 A1     Mar. 7, 2019

(30) Foreign Application Priority Data

Mar. 10, 2016 (KR) ........................ 10-2016-0028962

(51) Int. Cl.
*G01S 13/76* (2006.01)
*H04W 64/00* (2009.01)
(Continued)

(52) U.S. Cl.
CPC .............. *G01S 13/765* (2013.01); *G01S 3/14* (2013.01); *G01S 3/50* (2013.01); *G01S 5/0081* (2013.01);
(Continued)

(58) Field of Classification Search
CPC ....... H04W 64/00; H04W 4/80; H04W 4/027; H04W 4/023; H04W 4/026; H04W 4/025;
(Continued)

(56) References Cited

U.S. PATENT DOCUMENTS 9,538,500 B2   1/2017   Cho et al.
9,942,709 B2   4/2018   Sung
(Continued)

FOREIGN PATENT DOCUMENTS

EP    1251709 A2 * 10/2002 ............ H04W 64/00
KR    101038504      6/2011
(Continued)

OTHER PUBLICATIONS

European Search Report dated Feb. 4, 2019 issued in counterpart application No. 17763493.8-1206, 10 pages.
(Continued)

*Primary Examiner* — Olumide Ajibade Akonai
(74) *Attorney, Agent, or Firm* — The Farrell Law Firm, P.C.

(57) ABSTRACT

An electronic device according to various embodiments of the present invention may include at least one antenna, a communication module, a sensor module for sensing a direction of the electronic device, and a processor, wherein the processor may be configured to receive at least one wireless communication signal from a first external electronic device through the communication module, obtain direction information of the electronic device using the sensor module, receive at least one wireless communication signal information received at a second external electronic device and direction information of the second external electronic device from the second external electronic device, and determine the direction in which the first external electronic device is located, by using the at least one
(Continued)

wireless communication signal information received from the first external electronic device, the direction information of the electronic device, and the at least one wireless communication signal information and the direction information of the second external electronic device received from the second external electronic device. In addition, other embodiments are also possible.

13 Claims, 14 Drawing Sheets

(51) Int. Cl.
| | |
|---|---|
| G01S 3/14 | (2006.01) |
| H04W 88/02 | (2009.01) |
| G01S 5/00 | (2006.01) |
| G01S 5/04 | (2006.01) |
| H04B 17/318 | (2015.01) |
| G01S 3/50 | (2006.01) |
| G01S 11/06 | (2006.01) |
| H04L 12/26 | (2006.01) |
| H04W 4/029 | (2018.01) |

(52) U.S. Cl.
CPC ............... *G01S 5/04* (2013.01); *G01S 11/06* (2013.01); *H04B 17/318* (2015.01); *H04L 43/08* (2013.01); *H04W 64/00* (2013.01); *H04W 88/02* (2013.01); *H04W 4/029* (2018.02)

(58) Field of Classification Search
CPC ..... H04W 4/029; H04W 64/006; H04W 4/33; H04W 4/40; H04W 4/48; H04W 4/70; G01S 5/04; G01S 3/46; G01S 5/0221; G01S 17/66; G01S 19/13; G01S 11/04; G01S 5/0072
See application file for complete search history.

(56) References Cited

U.S. PATENT DOCUMENTS

| | | |
|---|---|---|
| 2006/0128354 A1 | 6/2006 | Carle et al. |
| 2009/0174546 A1 | 7/2009 | Lian et al. |
| 2009/0231181 A1 | 9/2009 | Yannone |
| 2010/0302014 A1 | 12/2010 | Gloo et al. |
| 2010/0323723 A1* | 12/2010 | Gerstenberger ...... G01S 5/0242 455/456.5 |
| 2012/0013508 A1* | 1/2012 | Bao ...................... G01S 5/0263 342/450 |
| 2013/0196681 A1 | 8/2013 | Poduri et al. |
| 2014/0022920 A1* | 1/2014 | Dua ...................... H04W 4/021 370/252 |
| 2015/0131460 A1* | 5/2015 | Sridhara ................ G01S 11/06 370/252 |
| 2015/0234033 A1* | 8/2015 | Jamieson ................ G01S 5/04 455/456.1 |
| 2015/0271641 A1 | 9/2015 | Sung |
| 2015/0282116 A1 | 10/2015 | Cho et al. |
| 2016/0205501 A1* | 7/2016 | Lee ..................... H04W 12/004 455/457 |
| 2016/0274229 A1 | 9/2016 | Oh et al. |

FOREIGN PATENT DOCUMENTS

| | | |
|---|---|---|
| KR | 1020130086765 | 8/2013 |
| KR | 1020140124418 | 10/2014 |
| KR | 1020150052753 | 5/2015 |
| KR | 1020150112659 | 10/2015 |
| WO | WO 2006/065219 | 6/2006 |

OTHER PUBLICATIONS

PCT/ISA/210 Search Report issued on PCT/KR2017/002009 (pp. 5).

PCT/ISA/237 Written Opinion issued on PCT/KR2017/002009 (pp. 7).

* cited by examiner

POSITION DETERMINATION METHOD AND DEVICE

PRIORITY

This application is a National Phase Entry of PCT International Application No. PCT/KR2017/002009 which was filed on Feb. 23, 2017, and claims priority to Korean Patent Application No. 10-2016-0028962, which was filed on Mar. 10, 2016, the content of each of which is incorporated herein by reference.

TECHNICAL FIELD

The present disclosure relates to a method and a device that determine a position of an external device.

BACKGROUND ART

With the development of electronic technologies, various electronic devices are being developed. Nowadays, portable electronic devices such as a smartphone, a tablet PC, and the like are widely used. While providing various services such as photograph shooting, music playback, video playback, an e-mail service, a social networking service (SNS), and the like, the portable electronic devices are becoming smaller and lighter due to their portability.

DETAILED DESCRIPTION OF THE INVENTION

Technical Problem

With the development of a wireless communication technology, various wireless communication technologies such as wireless fidelity (Wi-Fi), Bluetooth (BT), or the like, and a technology for estimating the positions of other electronic devices by using the above-described wireless communication technology have also been developed.

For the purpose of estimating the position of another electronic device using a portable electronic device, pieces of wireless communication signal information received from a plurality of antennas may be needed. However, with the miniaturization trend of the electronic device, it is difficult to mount the necessary number of antennas in one electronic device, and thus the accuracy of position estimation may be reduced.

To solve the above-mentioned problems and tasks issued in this disclosure, embodiments disclosed in the present disclosure may provide a method and a device for determining a position that are capable of improving the accuracy of the position determination of a specific electronic device by making a request for necessary information to an electronic device located at a periphery in the case where the information required to estimate the position is insufficient.

Technical Solution

According to various embodiments of the present disclosure, an electronic device may include a communication module, a sensor module sensing a direction of the electronic device, and a processor. The processor may be configured to receive at least one wireless communication signal from a first external electronic device through the communication module, to determine a direction of the first external electronic device based on the electronic device by using information about the wireless communication signal, to obtain direction information of the electronic device by using the sensor module, to receive direction information of the first external electronic device determined based on a second external electronic device and direction information of the second external electronic device, from the second external electronic device, and to determine a position of the first external electronic device by using the direction information of the first external electronic device determined based on the electronic device, the direction information of the electronic device, the direction information of the first external electronic device determined based on the second external electronic device, and the direction information of the second external electronic device.

According to various embodiments of the present disclosure, a position determination method of an electronic device may include receiving at least one wireless communication signal from a first external electronic device through a communication module, determining a direction of the first external electronic device based on the electronic device by using information about the wireless communication signal, obtaining direction information of the electronic device by using a sensor module, receiving direction information of the first external electronic device determined based on a second external electronic device and direction information of the second external electronic device, from the second external electronic device, and determining a position of the first external electronic device by using the direction information of the first external electronic device determined based on the electronic device, the direction information of the electronic device, the direction information of the first external electronic device determined based on the second external electronic device, and the direction information of the second external electronic device.

According to various embodiments of the present disclosure, an electronic device may include a housing including a first surface, a display exposed to the outside through the first surface, at least one communication circuit included in the display, a processor electrically connected to the display and the at least one communication circuit, and a memory electrically connected to the processor. The processor may be configured to receive a first signal from a first external electronic device through the at least one communication circuit, to receive a second signal including first information about a direction (e.g., orientation) of the second external electronic device and second information about a direction of the first external electronic device determined based on the second external electronic device, from the second external electronic device through the at least one communication circuit, to determine a direction of the first external electronic device based on the electronic device depending on the first signal, and to determine a position of the first external electronic device based on at least one of the first information, the second information, and a direction of the first external electronic device determined based on the electronic device.

Advantageous Effects of the Invention

According to various embodiments of the present disclosure, an electronic device may accurately determine the position of a target electronic device through the collaboration with an external electronic device and may determine the position of the target electronic device even in a position, where it is difficult to use GPS, such as an underground parking lot, or the like.

MODE FOR INVENTION

Figure 1:
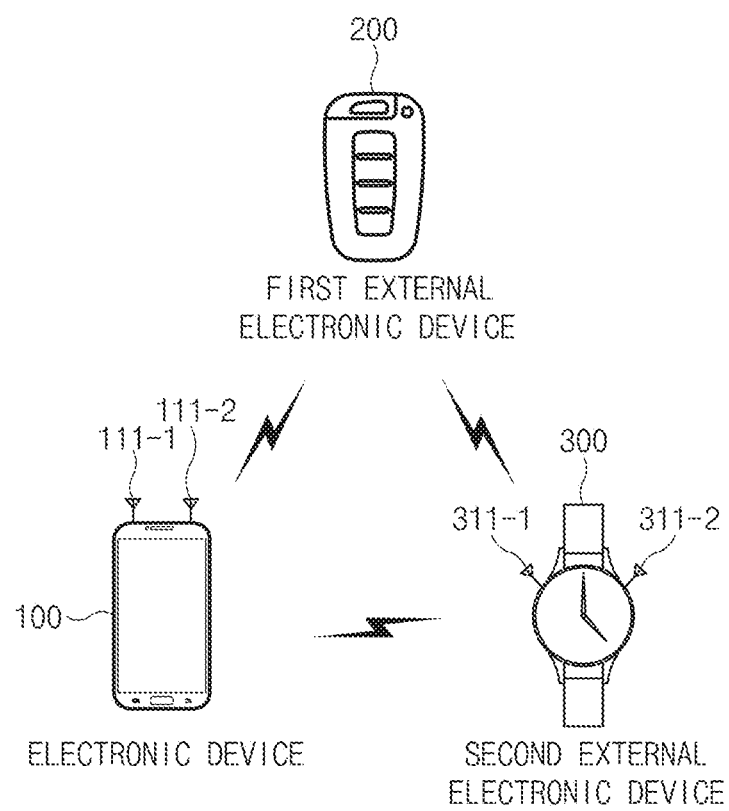
FIG. 1 is a diagram illustrating a position determination system, according to various embodiments of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a diagram illustrating a position determination system, according to various embodiments of the present disclosure.

Referring to FIG. 1, a position determination system may include an electronic device (or a main electronic device) 100, a first external electronic device (or target electronic device) 200, and a second external electronic device (or a helper electronic device) 300.

Signal information received from a plurality of antennas may be needed such that the electronic device 100 determines the position of the first external electronic device 200. In particular, the signal information received from the three antennas may be needed depending on the position estimation method such that the electronic device 100 estimates the exact position of the first external electronic device 200. The number of antennas supporting a frequency band used for a communication circuit by the electronic device 100 may be different; in the case where the electronic device 100 does not include three or more antennas, the electronic device 100 may not determine the position of the first external electronic device 200 or an error may occur upon determining a position. According to various embodiments of the present disclosure, in the case where the information needed to determine the position of the first external electronic device 200 is insufficient, the electronic device 100 may receive the position determination information from the second external electronic device 300 located at a periphery of the electronic device 100 to determine the position of the first external electronic device 200.

According to an embodiment, the electronic device 100 or the second external electronic device 300 may include a smartphone, a tablet PC, or a wearable device (e.g., wearable watch). According to an embodiment, the first external electronic device 200 may include a smart key for a vehicle, an accessory (e.g., a necklace or a watch) for a vehicle, a child, an old man, or an animal, a beacon device installed in a store, or the like. According to an embodiment, the electronic device 100 and the second external electronic device 300 may be interconnected via short-range wireless communication technology (e.g., BT, Bluetooth low energy (BLE) or Wi-Fi).

According to an embodiment, the electronic device 100 may determine the position (e.g., direction or distance) of the first external electronic device 200 based on information received from the first external electronic device 200 and the second external electronic device 300. According to an embodiment, the electronic device 100 may include at least one (e.g., plurality) antenna capable of receiving (or having a frequency band for receiving a wireless communication signal) a wireless communication signal received from the first external electronic device 200. For example, the electronic device 100 may include a first antenna 111-1 and a second antenna 111-2. According to an embodiment, the electronic device 100 may receive a wireless communication signal from the first external electronic device 200 via at least one antenna (e.g., the first antenna 111-1 and the second antenna 111-2). For example, the wireless communication signal may be a BLE beacon signal.

According to an embodiment, the first external electronic device 200 may transmit the wireless communication signal to the electronic device 100 and the second external electronic device 300. According to an embodiment, the first external electronic device 200 may transmit the wireless communication signal in a broadcasting manner. For example, the first external electronic device 200 may broadcast the BLE beacon signal.

According to an embodiment, the second external electronic device 300 may transmit position determination information depending on the request of the electronic device 100. According to an embodiment, the second external electronic device 300 may include at least one (e.g., plurality) antenna capable of receiving (or having a frequency band for receiving a wireless communication signal) a wireless communication signal received from the first external electronic device 200. For example, the second external electronic device 300 may include a first antenna 311-1 and a second antenna 311-2. According to an embodiment, the second external electronic device 300 may receive a wireless communication signal from the first external electronic device 200 via at least one antenna (e.g., the first antenna 311-1 and the second antenna 311-2). For example, the wireless communication signal may be a BLE beacon signal. According to an embodiment, the second external electronic device 300 may transmit information (or wireless communication signal information) associated with the wireless communication signal received from the first external electronic device 200, position information (e.g., position information determined based on the second external electronic device 300) of the first external electronic device 200, which is determined based on the wireless communication signal information, or position information (e.g., position information determined based on the electronic device 100) of the first external electronic device 200 corrected based on direction information of the electronic device 100 and the second external electronic device 300. For example, the wireless communication signal information may include at least one of phase information, reception pattern information, reception time information, and received signal strength (RSS) of the wireless communication signal.

According to an embodiment, the position determination system may include the at least one (e.g., plurality) second external electronic device 300. In the case where the position determination system includes the plurality of second external electronic devices 300, the electronic device 100 may receive position determination information from each of the plurality of second external electronic devices 300.

According to an embodiment, the total number of antennas included in the electronic device 100 and the second external electronic device 300 may be three or more. For example, in the case where the electronic device 100 includes one antenna, the second external electronic device 300 may include at least two antennas. For example, in the case where the electronic device 100 includes two antennas, the second external electronic device 300 may include at least one antenna. For another example, in the case where the electronic device 100 includes one antenna and the second external electronic device 300 includes one antenna, the electronic device 100 may make a request for information to another second external electronic device having at least one antenna. That is, the electronic device 100 may determine the position of the first external electronic device 200 based on the wireless communication signal information received from at least three antennas.

According to an embodiment, the electronic device 100 and the second external electronic device 300 may be the same as or different from an electronic device of a user. For example, the electronic device 100 may be an electronic device of a first user, and the second external electronic device 300 may be an electronic device of a second user.

Figure 2:
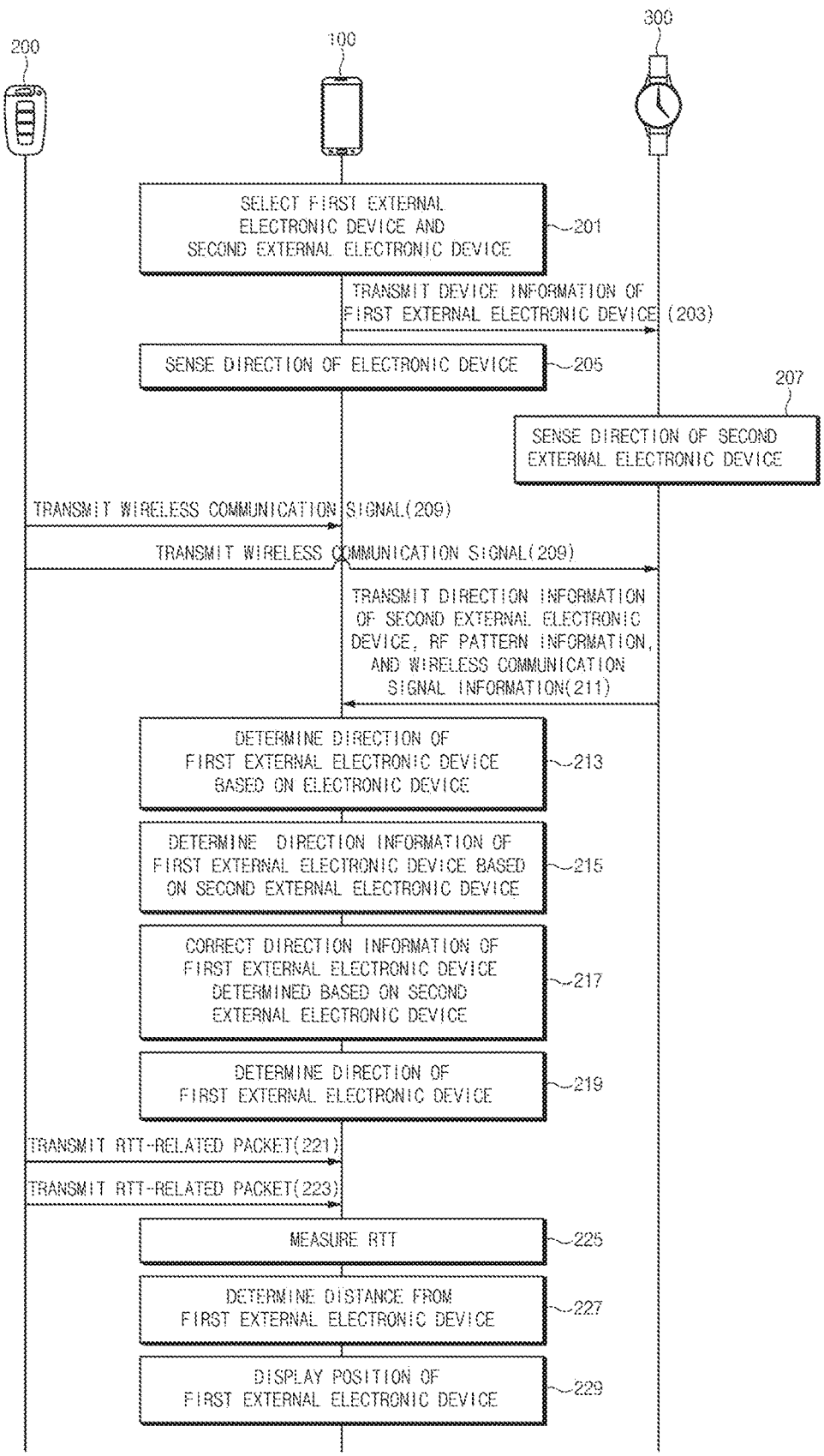
FIG. 2 is a view illustrating a position determination method of a position determination system, according to various embodiments of the present disclosure.

FIG. 2 is a view illustrating a position determination method of a position determination system, according to various embodiments of the present disclosure.

Referring to FIG. 2, in operation 201, the electronic device 100 may select the first external electronic device 200 and the at least one second external electronic device 300. According to an embodiment, the electronic device 100 may select the first external electronic device 200 and the second external electronic device 300 depending on a user input. For example, a user may select the first external electronic device 200 and the at least one second external electronic device 300 by using a user interface provided by an application (e.g., a position finding application).

According to an embodiment, in operation 203, the electronic device 100 may transmit device information of the first external electronic device 200 to the second external electronic device 300. For example, the device information may be the BT address, a BLE identifier (ID), or a media access control (MAC) address of the first external electronic device 200. According to an embodiment, the electronic device 100 may additionally make a request for at least one piece of received wireless communication signal information and the direction information of the second external electronic device 300 to the second external electronic device 300.

According to an embodiment, in operation 205, the electronic device 100 may sense the direction (e.g., orientation) of the electronic device 100. For example, the electronic device 100 may measure azimuth by using a sensor module (e.g., a geomagnetic sensor). For example, the electronic device 100 may determine whether the geomagnetic sensor is calibrated, before measuring the azimuth; when the calibration of the geomagnetic sensor is not completed, the electronic device 100 may measure the azimuth after calibrating the geomagnetic sensor.

According to an embodiment, in operation 207, the second external electronic device 300 may sense the direction (e.g., orientation) of the second external electronic device 300. For example, when the direction information (e.g., orientation information) is requested by the electronic device 100, the second external electronic device 300 may measure the azimuth by using the sensor module (e.g., the geomagnetic sensor). For example, the second external electronic device 300 may determine whether the geomagnetic sensor is calibrated, before measuring the azimuth; when the calibration of the geomagnetic sensor is not completed, the second external electronic device 300 may measure the azimuth after calibrating the geomagnetic sensor.

According to an embodiment, in operation 209, the first external electronic device 200 may transmit the wireless communication signal to the electronic device 100 and the second external electronic device 300. According to an embodiment, the first external electronic device 200 may transmit the wireless communication signal in a broadcasting manner. For example, the wireless communication signal may be a BLE beacon signal.

According to an embodiment, in operation 211, the second external electronic device 300 may transmit, to the electronic device 100, the direction information (e.g., orientation information) of the second external electronic device 300, a radio frequency (RF) pattern information of an antenna included in the second external electronic device 300, and the wireless communication signal information received from the first external electronic device 200. According to various embodiments, the second external electronic device 300 may transmit the direction information of the second external electronic device 300 and the wireless communication signal information together or separately.

According to an embodiment, in operation 213, the electronic device 100 may determine a direction in which the first external electronic device 200 is located, based on the electronic device 100. For example, the electronic device 100 may compare the wireless communication signal information (e.g., a signal reception pattern) received from the first external electronic device 200 with the RF pattern information of the antenna included in the electronic device 100 to determine the position of the first external electronic device 200.

According to an embodiment, in operation 215, the electronic device 100 may determine a direction in which the first external electronic device 200 is located, based on the second external electronic device 300. For example, the electronic device 100 may compare the wireless communication signal information (e.g., a signal reception pattern) received from the second external electronic device 300 with the RF pattern information of the antenna included in the second external electronic device 300 to determine the position of the first external electronic device 200.

According to an embodiment, in operation 217, the electronic device 100 may correct the direction information of the first external electronic device 200 determined based on the second external electronic device 300. For example, the electronic device 100 may correct the direction information of the first external electronic device 200 determined based on the second external electronic device 300, based on the electronic device 100 by using a difference value between the direction information of the electronic device 100 and the direction information of the second external electronic device 300.

According to an embodiment, in operation 219, the electronic device 100 may determine the direction of the first external electronic device 200. For example, the electronic device 100 may finally determine the direction of the first external electronic device 200 by using the direction information of the first external electronic device 200 determined in operation 213 and the direction information of the first external electronic device 200 corrected in operation 217.

According to an embodiment, in operation 221, the electronic device 100 may transmit a round trip time (RTT)-related packet to the first external electronic device 200.

According to an embodiment, in operation 223, the first external electronic device 200 may transmit the RTT-related packet to the electronic device 100.

According to an embodiment, in operation 225, the electronic device 100 may measure RTT, the destination of which is the first external electronic device 200. According to an embodiment, the electronic device 100 may measure the RTT based on the transmission time of the RTT-related packet and reception time of the RTT-related packet.

According to an embodiment, in operation 227, the electronic device 100 may determine the distance from the first external electronic device 200. According to an embodiment, the electronic device 100 may determine the distance from the first external electronic device 200 by using the RTT. The distance determination based on RTT may be based on Wi-Fi communication and may mean to determine a distance by removing a delay time at Wi-Fi connection point from a time difference between a pulse request time to a Wi-Fi connection point (e.g., the first external electronic device 200) and a pulse arrival time at a terminal (e.g., the electronic device 100) after round trip and converting the removal result to a distance.

According to an embodiment, in the case where the electronic device 100 determines only the direction without determining the distance from the first external electronic device 200, operation 221 to operation 227 illustrated in FIG. 2 may be skipped.

According to an embodiment, in operation 229, the electronic device 100 may display the position (e.g., a direction or a distance) of the first external electronic device 200 on a display. For example, the electronic device 100 may display the position of the first external electronic device 200 by using a user interface provided by an application.

According to an embodiment, for example, before the application is terminated or a termination command is entered by a user, operation 205 to operation 225 illustrated in FIG. 2 may be repeatedly performed in the case where information (e.g., direction information or wireless communication signal information) is changed or at a specified period. As such, even though the position of the electronic device 100, the first external electronic device 200, or the second external electronic device 300 is changed, the position information of the first external electronic device 200 may be continuously provided to a user.

According to an embodiment, operation 205 to operation 219 for determining a direction of the first external electronic device 200 may be performed independently of operation 221 to operation 227 for determining the distance between the electronic device 100 and the first external electronic device 200. For example, operation 205 to operation 219 and operation 221 to operation 227 may be performed irrespective of the order of time, or may be repeatedly performed depending on different periods.

Figure 3:
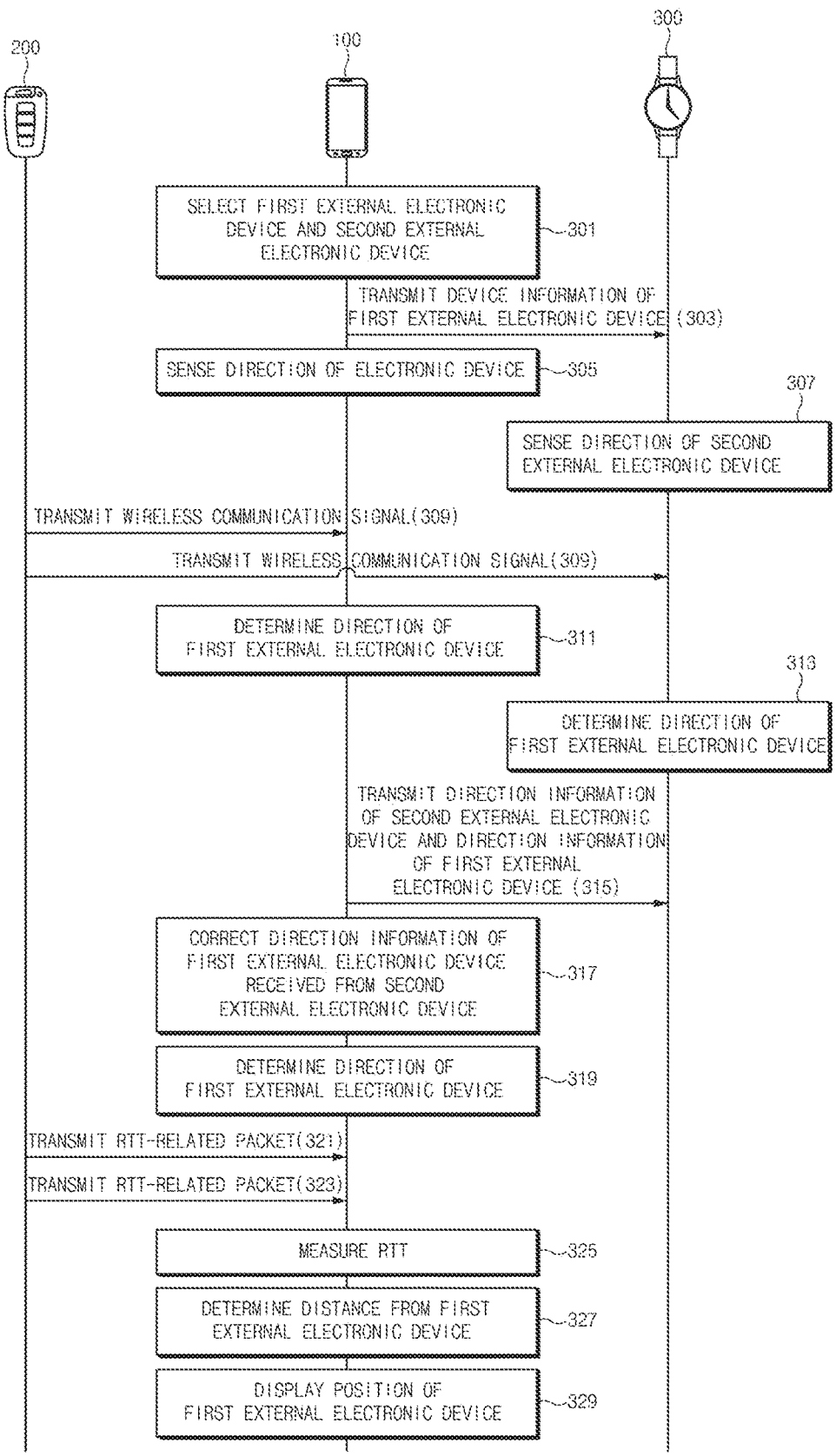
FIG. 3 is a view illustrating a position determination method of a position determination system, according to various embodiments of the present disclosure.

FIG. 3 is a view illustrating a position determination method of a position determination system, according to various embodiments of the present disclosure.

Referring to FIG. 3, in operation 301, the electronic device 100 may select the first external electronic device 200 and the at least one second external electronic device 300. According to an embodiment, the electronic device 100 may select the first external electronic device 200 and the second external electronic device 300 depending on a user input. For example, a user may select the first external electronic device 200 and the at least one second external electronic device 300 by using a user interface provided by an application (e.g., a position finding application).

According to an embodiment, in operation 303, the electronic device 100 may transmit device information of the first external electronic device 200 to the second external electronic device 300. For example, the device information may be the BT address, a BLE identifier (ID), or a media access control (MAC) address of the first external electronic device 200. According to an embodiment, the electronic device 100 may additionally make a request for at least one piece of received wireless communication signal information and the direction information of the second external electronic device 300 to the second external electronic device 300.

According to an embodiment, in operation 305, the electronic device 100 may sense the direction (e.g., orientation) of the electronic device 100. For example, the electronic device 100 may measure azimuth by using a sensor module (e.g., a geomagnetic sensor). For example, the electronic device 100 may determine whether the geomagnetic sensor is calibrated, before measuring the azimuth; when the calibration of the geomagnetic sensor is not completed, the electronic device 100 may measure the azimuth after calibrating the geomagnetic sensor.

According to an embodiment, in operation 307, the second external electronic device 300 may sense the direction (e.g., orientation) of the second external electronic device 300. For example, when the direction information is requested by the electronic device 100, the second external electronic device 300 may measure the azimuth by using the sensor module (e.g., the geomagnetic sensor). For example, the second external electronic device 300 may determine whether the geomagnetic sensor is calibrated, before measuring the azimuth; when the calibration of the geomagnetic sensor is not completed, the second external electronic device 300 may measure the azimuth after calibrating the geomagnetic sensor.

According to an embodiment, in operation 309, the first external electronic device 200 may transmit the wireless communication signal to the electronic device 100 and the second external electronic device 300. According to an embodiment, the first external electronic device 200 may transmit the wireless communication signal in a broadcasting manner. For example, the wireless communication signal may be a BLE beacon signal.

According to an embodiment, in operation 311, the electronic device 100 may determine a direction in which the first external electronic device 200 is located, based on the electronic device 100. For example, the electronic device 100 may compare the wireless communication signal information (e.g., a signal reception pattern) received from the first external electronic device 200 with the RF pattern information of the antenna included in the electronic device 100 to determine the position of the first external electronic device 200.

According to an embodiment, in operation 313, the second external electronic device 300 may determine a direction in which the first external electronic device 200 is located, based on the second external electronic device 300. For example, the second external electronic device 300 may compare the wireless communication signal information (e.g., a signal reception pattern) received from the first external electronic device 200 with the RF pattern information of the antenna included in the second external electronic device 300 to determine the position of the first external electronic device 200.

According to an embodiment, in operation 315, the second external electronic device 300 may transmit, to the electronic device 100, the direction information of the second external electronic device 300 and the direction information of the first external electronic device 200 determined based on the second external electronic device 300. According to various embodiments, the second external electronic device 300 may transmit the direction information of the second external electronic device 300 and the direction information of the first external electronic device 200 together or separately.

According to an embodiment, in operation 317, the electronic device 100 may correct the direction information of the first external electronic device 200 determined based on the second external electronic device 300. For example, the electronic device 100 may correct the direction information of the first external electronic device 200 determined based on the second external electronic device 300, based on the electronic device 100 by using a difference value between the direction information of the electronic device 100 and the direction information of the second external electronic device 300.

According to an embodiment, in operation 319, the electronic device 100 may determine the direction of the first external electronic device 200. For example, the electronic device 100 may finally determine the direction of the first external electronic device 200 by using the direction information of the first external electronic device 200 determined in operation 213 and the direction information of the first external electronic device 200 corrected in operation 217.

According to an embodiment, in operation 321, the electronic device 100 may transmit an RTT-related packet to the first external electronic device 200.

According to an embodiment, in operation 323, the first external electronic device 200 may transmit the RTT-related packet to the electronic device 100.

According to an embodiment, in operation 325, the electronic device 100 may measure RTT, the destination of which is the first external electronic device 200. According to an embodiment, the electronic device 100 may measure the RTT based on the transmission time of the RTT-related packet and reception time of the RTT-related packet.

According to an embodiment, in operation 327, the electronic device 100 may determine the distance from the first external electronic device 200. According to an embodiment, the electronic device 100 may determine the distance from the first external electronic device 200 by using the RTT.

According to an embodiment, in the case where the electronic device 100 determines only the direction without determining the distance from the first external electronic device 200, operation 321 to operation 327 illustrated in FIG. 3 may be skipped.

According to an embodiment, in operation 329, the electronic device 100 may display the position (e.g., a direction and a distance) of the first external electronic device 200 on a display. For example, the electronic device 100 may display the position of the first external electronic device 200 by using a user interface provided by an application.

According to an embodiment, for example, before the application is terminated or a termination command is entered by a user, operation 305 to operation 325 illustrated in FIG. 3 may be repeatedly performed in the case where information (e.g., direction information or wireless communication signal information) is changed or at a specified period. As such, even though the position of the electronic device 100, the first external electronic device 200, or the second external electronic device 300 is changed, the position information of the first external electronic device 200 may be continuously provided to a user.

According to an embodiment, operation 305 to operation 319 for determining a direction of the first external electronic device 200 may be performed independently of operation 321 to operation 327 for determining the distance between the electronic device 100 and the first external electronic device 200. For example, operation 305 to operation 319 and operation 321 to operation 327 may be performed irrespective of the order of time, or may be repeatedly performed depending on different periods.

Figure 4:
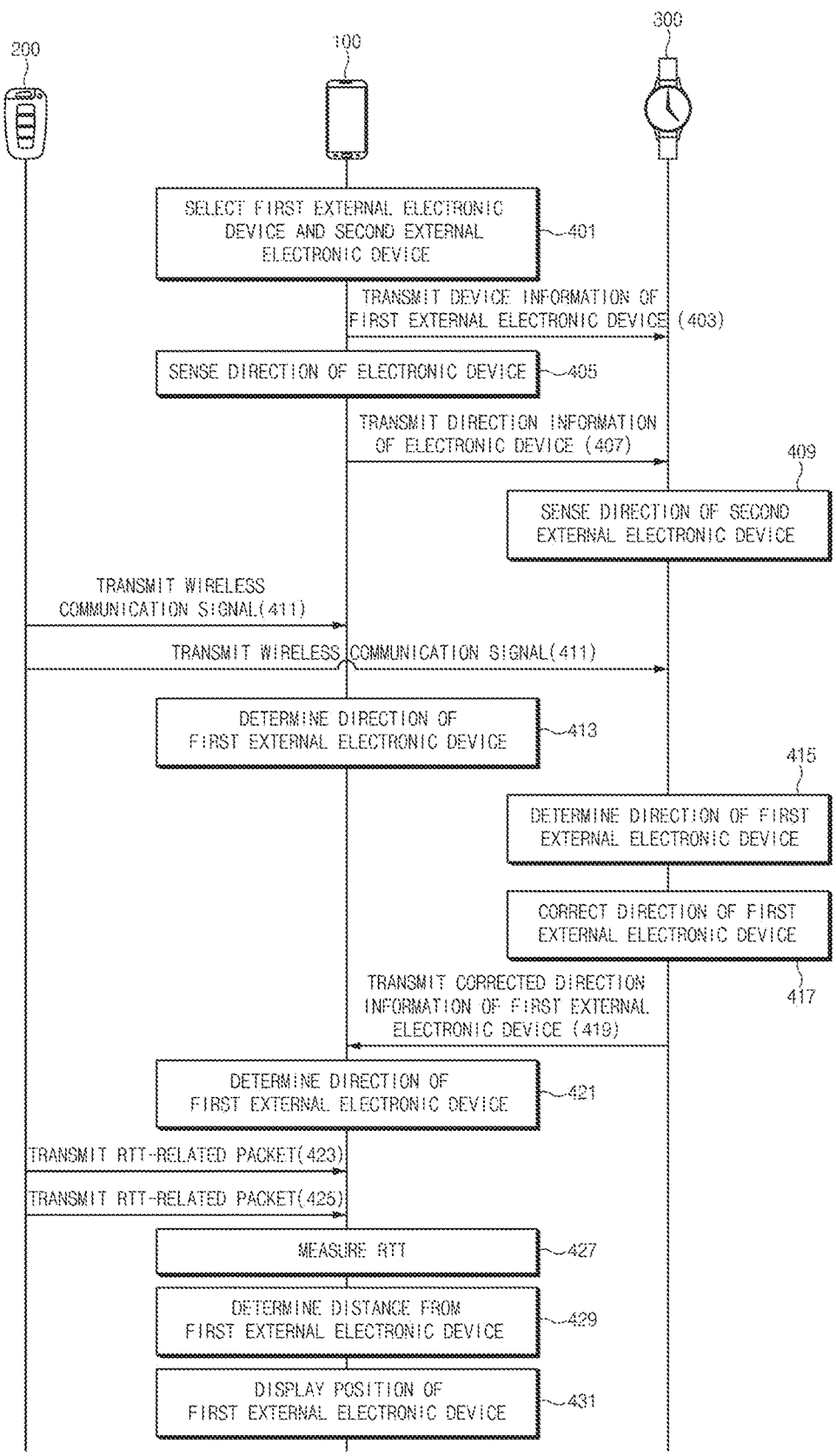
FIG. 4 is a view illustrating a position determination method of a position determination system, according to various embodiments of the present disclosure.

FIG. 4 is a view illustrating a position determination method of a position determination system, according to various embodiments of the present disclosure.

Referring to FIG. 4, in operation 401, the electronic device 100 may select the first external electronic device 200 and the at least one second external electronic device 300. According to an embodiment, the electronic device 100 may select the first external electronic device 200 and the second external electronic device 300 depending on a user input. For example, a user may select the first external electronic device 200 and the at least one second external electronic device 300 by using a user interface provided by an application (e.g., a position finding application).

According to an embodiment, in operation 403, the electronic device 100 may transmit device information of the first external electronic device 200 to the second external electronic device 300. For example, the device information may be the BT address, a BLE identifier (ID), or a media access control (MAC) address of the first external electronic device 200. According to an embodiment, the electronic device 100 may additionally make a request for at least one piece of received wireless communication signal information and the direction information of the second external electronic device 300 to the second external electronic device 300.

According to an embodiment, in operation 405, the electronic device 100 may sense the direction (e.g., orientation) of the electronic device 100. For example, the electronic device 100 may measure azimuth by using a sensor module (e.g., a geomagnetic sensor). For example, the electronic device 100 may determine whether the geomagnetic sensor is calibrated, before measuring the azimuth; when the calibration of the geomagnetic sensor is not completed, the electronic device 100 may measure the azimuth after calibrating the geomagnetic sensor.

According to an embodiment, in operation 407, the electronic device 100 may transmit direction information (e.g., orientation information) of the electronic device 100 to the second external electronic device 300.

According to an embodiment, in operation 409, the second external electronic device 300 may sense the direction (e.g., orientation) of the second external electronic device 300. For example, when the direction information is requested by the electronic device 100, the second external electronic device 300 may measure the azimuth by using the sensor module (e.g., the geomagnetic sensor). For example, the second external electronic device 300 may determine whether the geomagnetic sensor is calibrated, before measuring the azimuth; when the calibration of the geomagnetic sensor is not completed, the second external electronic device 300 may measure the azimuth after calibrating the geomagnetic sensor.

According to an embodiment, in operation 411, the first external electronic device 200 may transmit the wireless communication signal to the electronic device 100 and the second external electronic device 300. According to an embodiment, the first external electronic device 200 may transmit the wireless communication signal in a broadcasting manner. For example, the wireless communication signal may be a BLE beacon signal.

According to an embodiment, in operation 413, the electronic device 100 may determine a direction in which the first external electronic device 200 is located, based on the electronic device 100. For example, the electronic device 100 may compare the wireless communication signal information (e.g., a signal reception pattern) received from the first external electronic device 200 with the RF pattern information of the antenna included in the electronic device 100 to determine the position of the first external electronic device 200.

According to an embodiment, in operation 415, the second external electronic device 300 may determine a direction in which the first external electronic device 200 is located, based on the second external electronic device 300. For example, the second external electronic device 300 may compare the wireless communication signal information (e.g., a signal reception pattern) received from the first external electronic device 200 with the RF pattern information of the antenna included in the second external electronic device 300 to determine the position of the first external electronic device 200.

According to an embodiment, in operation 417, the second external electronic device 300 may correct the direction information of the first external electronic device 200 determined based on the second external electronic device 300. For example, the second external electronic device 300 may correct the direction information of the first external electronic device 200 determined based on the second external electronic device 300, based on the electronic device 100 by using a difference value between the direction information of the electronic device 100 and the direction information of the second external electronic device 300.

According to an embodiment, in operation 419, the second external electronic device 300 may transmit, to the electronic device 100, the corrected direction information of the first external electronic device 200.

According to an embodiment, in operation 421, the electronic device 100 may determine the direction of the first external electronic device 200. For example, the electronic device 100 may finally determine the direction of the first external electronic device 200 by using the direction information of the first external electronic device 200 determined in operation 413 and the direction information of the first external electronic device 200 received from the second external electronic device 300 in operation 417.

According to an embodiment, in operation 423, the electronic device 100 may transmit an RTT-related packet to the first external electronic device 200.

According to an embodiment, in operation 425, the first external electronic device 200 may transmit the RTT-related packet to the electronic device 100.

According to an embodiment, in operation 427, the electronic device 100 may measure RTT, the destination of which is the first external electronic device 200. According to an embodiment, the electronic device 100 may measure the RTT based on the transmission time of the RTT-related packet and reception time of the RTT-related packet.

According to an embodiment, in operation 429, the electronic device 100 may determine the distance from the first external electronic device 200. According to an embodiment, the electronic device 100 may determine the distance from the first external electronic device 200 by using the RTT.

According to an embodiment, in the case where the electronic device 100 determines only the direction without determining the distance from the first external electronic device 200, operation 423 to operation 429 illustrated in FIG. 4 may be skipped.

According to an embodiment, in operation 431, the electronic device 100 may display the position (e.g., a direction and a distance) of the first external electronic device 200 on a display. For example, the electronic device 100 may display the position of the first external electronic device 200 by using a user interface provided by an application.

According to an embodiment, For example, before the application is terminated or a termination command is entered by a user, operation 405 to operation 429 illustrated in FIG. 4 may be repeatedly performed in the case where information (e.g., direction information or wireless communication signal information) is changed or at a specified period. As such, even though the position of the electronic device 100, the first external electronic device 200, or the second external electronic device 300 is changed, the position information of the first external electronic device 200 may be continuously provided to a user.

According to an embodiment, operation 405 to operation 421 for determining a direction of the first external electronic device 200 may be performed independently of operation 423 to operation 429 for determining the distance between the electronic device 100 and the first external electronic device 200. For example, operation 405 to operation 421 and operation 423 to operation 429 may be performed irrespective of the order of time, or may be repeatedly performed depending on different periods.

Figure 5:
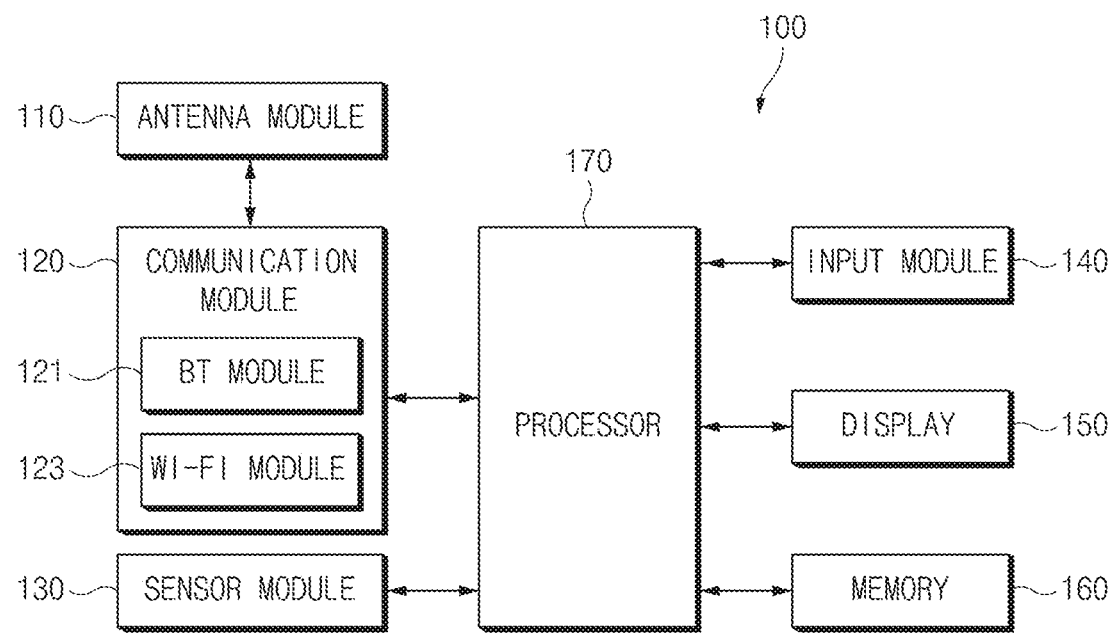
FIG. 5 is a block diagram illustrating a configuration of an electronic device, according to various embodiments of the present disclosure.

FIG. 5 is a block diagram illustrating a configuration of an electronic device according to various embodiments of the present disclosure.

Referring to FIG. 5, the electronic device 100 may include an antenna module (or antenna circuit) 110, a communication module (or a communication circuit) 120, a sensor module (or a sensor circuit) 130, an input module (or an input interface) 140, a display 150, a memory 160, and a processor 170.

According to an embodiment, the antenna module 110 may transmit and/or receive a signal to and/or from an external electronic device (e.g., the first external electronic device 200 and the second external electronic device 300) under control of the communication module 120. For example, the antenna module 110 may receive a wireless communication signal from the first external electronic device 200. For another example, the antenna module 110 may transmit device information of the first external electronic device 200 to the second external electronic device 300 and may receive wireless communication signal information from the second external electronic device 300, position information (e.g., position information determined based on the second external electronic device 300) of the first external electronic device 200 determined based on the wireless communication signal information, or position information determined based on position information (e.g., the electronic device 100) of the first external electronic device 200 corrected depending on direction information of each of the electronic device 100 and the second external electronic device 300.

According to an embodiment, the antenna module 110 may include one antenna or a plurality of antennas. According to an embodiment, each of the plurality of antennas may receive a wireless communication signal from the first external electronic device 200.

According to an embodiment, the communication module 120 may communicate with an external electronic device by using the antenna module 110. According to an embodiment, the communication module 120 may include a BT module 121 and a Wi-Fi module 123. According to an embodiment, the communication module 120 may transmit, to the processor 170, information associated with the wireless communication signal received by the antenna module 110. For example, the communication module 120 may transmit, to the processor 170, at least one of phase information, reception pattern information, and reception time information of the wireless communication signal. Hereinafter, operations of the antenna module 110 and the communication module 120 will be described in detail with reference to FIG. 6.

Figure 6:
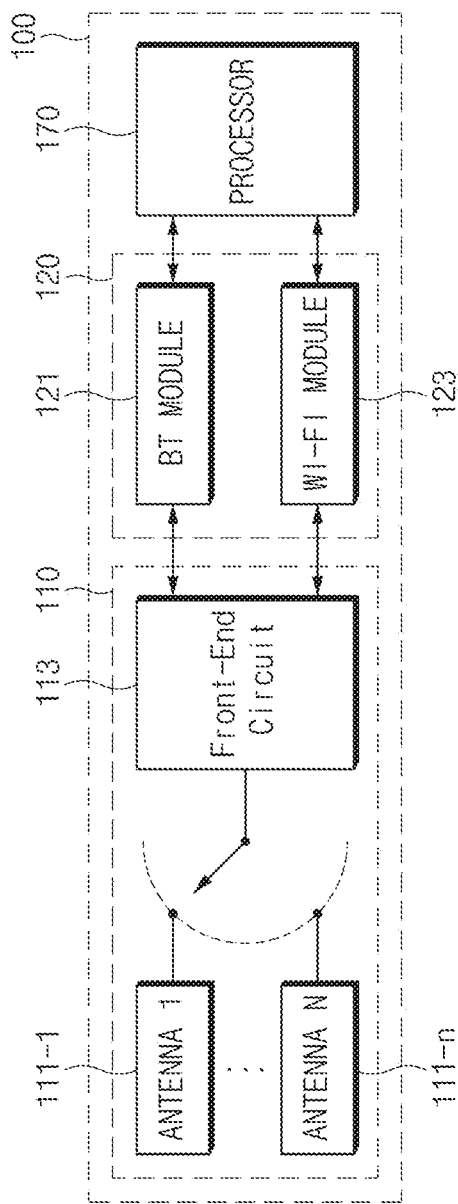
FIG. 6 is a block diagram illustrating configurations of an antenna module and a communication module, according to various embodiments of the present disclosure.

FIG. 6 is a block diagram illustrating configurations of an antenna module and a communication module, according to various embodiments of the present disclosure.

Referring to FIG. 6, the antenna module 110 may include at least one or more (e.g., 'N') antennas 111-1 to 111-N and a front-end circuit 113. Each of at least one or more antennas may transmit and/or receive a RF signal (e.g., a BT signal or a Wi-Fi signal). According to an embodiment, the front-end circuit 113 may include a switch. According to an embodiment, the front-end circuit 113 may control a switch to change at least one antenna that will receive a wireless communication signal. For example, the front-end circuit 113 may be sequentially connected to each of at least one or more antennas so as to receive a wireless communication signal from the first external electronic device 200.

According to an embodiment, the communication module 120 may include the BT module 121 and the Wi-Fi module 123. According to an embodiment, the BT module 121 may transmit and/or receive a BT signal through the antenna module 110. According to an embodiment, the BT module 121 may verify information associated with a wireless communication signal (e.g., a BLE beacon signal) received from the first external electronic device 200. For example, the BT module 121 may verify at least one of phase information, reception pattern information, reception time information, and RSS of the wireless communication signal. According to an embodiment, in the case where the antenna module 110 includes a plurality of antennas, the BT module 121 may verify the wireless communication signal information received by each of a plurality of antennas. According to an embodiment, the BT module 121 may transmit wireless communication signal information to the processor 170. According to an embodiment, the Wi-Fi module 123 may transmit and/or receive a Wi-Fi signal by using the antenna module 110. The Wi-Fi module 123 may determine the distance from the first external electronic device 200 by using an RTT-related packet. For example, the Wi-Fi module 123 may transmit the RTT-related packet for measuring RTT to the first external electronic device 200 and may receive the RTT-related packet from the first external electronic device 200. The Wi-Fi module 123 may measure the RTT, the destination of which is the first external electronic device 200, by using the transmission time of the RTT-related packet and the reception time of the RTT-related packet. According to an embodiment, the Wi-Fi module 123 may transmit the measured RTT to the processor 170.

According to an embodiment, the sensor module 130 may sense the state of an electronic device. According to an embodiment, the sensor module 130 may include a geomagnetic sensor. According to an embodiment, the sensor module 130 may sense the direction (e.g., azimuth) of the electronic device 100 by using the geomagnetic sensor.

According to an embodiment, the input module 140 (or a user input device) may receive (or sense) a user input. According to an embodiment, the input module 140 may include a touch sensor panel that senses a touch manipulation of a user or a pen sensor panel (e.g., digitizer) that senses a pen manipulation of a user. According to an embodiment, the input module 140 may include a motion recognition sensor for recognizing the motion of a user or a speech recognition sensor for recognizing the voice of a user.

According to an embodiment, the input module 140 may receive a user input that selects the first external electronic device 200 being the target of position determination and at least one second external electronic device 300 to assist in position determination.

According to an embodiment, the display 150 may display a user interface. The display 150 may be exposed to the outside through a first surface of a housing surrounding the electronic device 100. According to an embodiment, the display 150 may display a user interface for selecting the first external electronic device 200 and the second external electronic device 300. According to an embodiment, the display 150 may display a user interface indicating the position (a direction or a distance) of the first external electronic device 200.

According to an embodiment, the input module 140 and the display 150, for example, may be implemented with a touch screen that is capable of displaying and sensing the touch manipulation at the same time. In the touch screen, an input panel may be disposed on the display panel.

According to an embodiment, the memory 160 (e.g., a nonvolatile memory) may store RF pattern information (e.g., a phase or an amplitude) received by at least one antenna included in the antenna module 110. For example, the memory 160 may store pattern information according to the reception direction of a signal with respect to an antenna included in the antenna module 110. According to an embodiment, the memory 160 may store RF pattern information for each antenna included in the antenna module 110. According to an embodiment, the memory 160 may store RF pattern information for each antenna included in the second external electronic device 300.

According to an embodiment, the processor 170 (e.g., an application processor) may control overall operations of the electronic device 100. According to an embodiment, the processor 170 may include at least one processor. According to an embodiment, the processor 170 may determine the position of the first external electronic device 200 according to various embodiments of the present disclosure by controlling the communication module 120, the sensor module 130, the input module 140, the display 150, and the memory 160. According to an embodiment, the processor 170 may be implemented with a system on chip (SoC) that includes a central processing unit (CPU), a graphic processing unit (GPU), a memory, or the like.

According to an embodiment, the processor 170 may execute an application (e.g., a position finding application). For example, the processor 170 may execute an application depending on the user input received through the input module 140. When the application is executed, for example, the user interface provided by the application may be displayed on the display 150. A user may select the first external electronic device 200 and the second external electronic device 300 through the user interface displayed on the display 150 and may verify the position of the first external electronic device 200. According to an embodiment, in the case where a user of the electronic device 100 is the same as a user of the second external electronic device 300 or in the case where the preregistered second external electronic device 300 is present, the processor 170 may select the corresponding device without a user input.

According to an embodiment, when the first external electronic device 200 and the second external electronic device 300 are selected (or when finding the position of the first external electronic device is requested by the user), the processor 170 may transmit device information of the first external electronic device 200 to the second external electronic device 300.

According to an embodiment, when the first external electronic device 200 and the second external electronic device 300 are selected (or when finding the position of the first external electronic device is requested by the user), the processor 170 may obtain the direction information (e.g., orientation information) of the electronic device 100 by using the sensor module 130. According to an embodiment, the processor 170 may periodically obtain the direction information of the electronic device 100.

According to an embodiment, when the first external electronic device 200 and the second external electronic device 300 are selected (or when finding the position of the first external electronic device 200 is requested by the user), the processor 170 may make a request for position determination information to the second external electronic device 300 through the communication module 120. According to an embodiment, the processor 170 may receive wireless communication signal information received by the second external electronic device 300 from the first external electronic device 200, RF pattern information of an antenna included in the second external electronic device 300, and direction information of the second external electronic device 300, from the second external electronic device 300 through the communication module 120. According to an embodiment, the processor 170 may receive position information (e.g., position information determined based on the second external electronic device 300) of the first external electronic device 200 determined based on wireless communication signal information and the direction information of the second external electronic device 300, from the second external electronic device 300 through the communication module 120. According to an embodiment, the processor 170 may receive position information (e.g., position information determined based on the electronic device 100) of the first external electronic device 200 corrected based on direction information of each of the electronic device 100 and the second external electronic device 300 from the second external electronic device 300 through the communication module 120. According to an embodiment, the processor 170 may receive wireless communication signal information of the number corresponding to the number of antennas included in the second external electronic device 300 from the second external electronic device 300 or the position information of the first external electronic device 200.

According to various embodiments of the present disclosure, the processor 170 may determine the direction in which the first external electronic device 200 is located by using at least one wireless communication signal information received from the first external electronic device 200, direction information of the electronic device 100, and information received from the second external electronic device 300 (based on the electronic device 100).

According to an embodiment, the processor 170 may determine the direction in which the first external electronic device 200 is located, by using a method of matching an RF pattern. According to an embodiment, the processor 170 may compare information about a signal reception pattern (e.g., phase or amplitude pattern) with the pre-measured RF pattern information to determine the direction in which the first external electronic device 200 is located. The processor 170 may compare the reception pattern of a signal received by each of at least one or more antennas 111-1 to 111-N with RF pattern information of at least one antenna stored in the memory 160 to determine the direction in which the signal is received.

According to an embodiment, the processor 170 may receive reception pattern information of a signal received by an antenna included in the second external electronic device 300 and RF pattern information of the antenna included in the second external electronic device 300, from the second external electronic device 300. After being stored in a memory included in the second external electronic device 300, the RF pattern information of the antenna included in the second external electronic device 300 may be transmitted to the electronic device 100. The processor 170 may compare reception pattern information of the signal received by the antenna included in the second external electronic device 300 with RF pattern information of the antenna included in the second external electronic device 300 to determine the direction in which the signal is received, based on the second external electronic device 300.

According to an embodiment, the processor 170 may receive signal reception direction information of the antenna included in the second external electronic device 300, from the second external electronic device 300. For example, the second external electronic device 300 may compare reception pattern information of the signal received by the antenna included in the second external electronic device 300 with RF pattern information of the antenna included in the second external electronic device 300 to determine the direction in which the signal is received, based on the second external electronic device 300 and may transmit the signal reception direction information to the electronic device 100.

According to an embodiment, the processor 170 may correct the signal reception direction determined based on the second external electronic device 300, to signal reception direction that is based on the electronic device 100 by using direction information of each of the electronic device 100 and the second external electronic device 300. For example, the processor 170 may correct signal reception direction determined based on the second external electronic device 300, by using a difference value between direction information of the electronic device 100 and direction information of the second external electronic device 300.

According to an embodiment, the signal reception direction may be corrected by the second external electronic device 300. For example, the second external electronic device 300 may correct signal reception direction determined based on the second external electronic device 300, based on the direction information of the electronic device 100 and the direction information of the second external electronic device 300 and may transmit information about the corrected signal reception direction to the electronic device 100.

According to an embodiment, the processor 170 may finally determine the direction in which the first external electronic device 200 is located, based on a plurality of signal reception directions. For example, when the signal reception direction is determined based on the signal reception pattern received by each of a plurality of antennas, the processor 170 may determine that the first external electronic device 200 is located in the signal reception direction determined in common by the plurality of antennas. For example, when the signal reception direction determined by the reception pattern of the first antenna 111-1 included in the electronic device 100 is a first direction, a second direction, or a third direction, when the direction determined by the signal reception pattern of the second antenna 111-2 is the second direction or a fourth direction, when the signal reception direction determined by the reception pattern of an antenna included in the second external electronic device 300 is the second direction, a fifth direction, or a sixth direction, the processor 170 may determine that the first external electronic device 200 is located in the second direction. As the number of antennas used to determine the position of the first external electronic device 200 increases, the accuracy may increase.

According to an embodiment, the processor 170 may determine the direction in which the first external electronic device 200 is located, by using angle of arrival (AOA). For example, the processor 170 may determine the direction of the signal source (e.g., the first external electronic device 200) by using the phase information of the signal received by the plurality of antennas having the same directivity. The AOA may correspond to the reverse process of the beam-forming technology for controlling the phase of the signal transmitted through the plurality of antennas such that the directionality of each of the antennas is changed. In the AOA, it is assumed that the directivity of each of the plurality of antennas is the same. However, in the case where the direction of the electronic device 100 is different from the direction of the second external electronic device 300, the directivity of the antenna included in the electronic device 100 may be different from the directivity of the antenna included in the second external electronic device 300. As such, the processor 170 may display a user interface that induces a user such that the direction of the electronic device 100 coincides with the direction of the second external electronic device 300, on the display 150. This will be described with reference to FIG. 8.

According to an embodiment, the processor 170 may determine the direction of the second external electronic device 300 by using the phase information of a wireless communication signal received from the first external electronic device 200 and the phase information of a wireless communication signal received from the second external electronic device 300.

According to an embodiment, the processor 170 may determine the position of the first external electronic device 200 by using time of arrival (TOA). According to an embodiment, the processor 170 may determine a distance between the first external electronic device 200 and each device (e.g., the electronic device 100 and the second external electronic device 300), by using reception time information of each of wireless communication signals received by the electronic device 100 and the at least one second external electronic device 300. According to an embodiment, when pieces of reception time information are received from the second external electronic device 300 (e.g., in the case where the one second external electronic device 300 includes a plurality of antennas), the processor 170 may determine the distance between the first external electronic device 200 and the second external electronic device 300 by using an intermediate value (e.g., an average value) of the pieces of reception time information.

According to an embodiment, the processor 170 may measure RTT, the destination of which is the second external electronic device 300, by using the communication module 120. According to an embodiment, the communication module 120 (e.g., the Wi-Fi module 123) may transmit an RTT-related packet for measuring the RTT to the second external electronic device 300 and may receive the RTT-related packet from the second external electronic device 300. According to an embodiment, the communication module 120 may measure the RTT, the destination of which is the second external electronic device 300, by using the transmission time of the RTT-related packet and the reception time of the RTT-related packet. According to an embodiment, the processor 170 may determine the distance from the second external electronic device 300 by using the RTT.

For the purpose of determining the position of the first external electronic device 200 using the TOA, the position of the second external electronic device 300 needs to be specified. The processor 170 may verify the distance of the second external electronic device 300 by using the RTT, but may not verify the direction in which the second external electronic device 300 is located. As such, for the purpose of specifying the direction of the second external electronic device 300, the processor 170 may display a user interface that directs the direction of the second external electronic device 300 in a specific direction on the display 150. This will be described with reference to FIG. 8.

According to an embodiment, the processor 170 may determine a position (a direction and a distance) of the first external electronic device 200 by using a distance between the first external electronic device 200 and each device (e.g., the electronic device 100 and the second external electronic device 300) and a position (a direction and a distance) of the second external electronic device 300. For example, according to an embodiment, the processor 170 may draw a circle with a radius being the distance from the first external electronic device 200, based on the position of each of the electronic device 100 and the at least one second external electronic device 300 and may determine the intersection of a plurality of circles as the position of the first external electronic device 200. According to an embodiment, in the case where the processor 170 recognizes signal reception time information and information about position (a direction and a distance) of each of three electronic devices (e.g., the electronic device 100 and two or more second external electronic devices 300, the processor 170 may determine the exact position of the first external electronic device 200 by using TOA.

According to an embodiment, the processor 170 may determine the position of the first external electronic device 200 by using time difference of arrival (TDOA). According to an embodiment, the processor 170 may calculate a reception time difference by using reception time information of each of wireless communication signals received by the electronic device 100 and the at least one second external electronic device 300. According to an embodiment, when pieces of reception time information are received from the second external electronic device 300 (e.g., in the case where the one second external electronic device 300 includes a plurality of antennas), the processor 170 may calculate a reception time difference between the electronic device 100 and the at least one second external electronic device 300, by using an intermediate value (e.g., an average value) of pieces of reception time information. According to an embodiment, the processor 170 may calculate a distance corresponding to the reception time difference.

According to an embodiment, the processor 170 may measure RTT, the destination of which is the second external electronic device 300, by using the communication module 120. According to an embodiment, the communication module 120 (e.g., the Wi-Fi module 123) may transmit an RTT-related packet for measuring the RTT to the second external electronic device 300 and may receive the RTT-related packet from the second external electronic device 300. According to an embodiment, the communication module 120 may measure the RTT, the destination of which is the second external electronic device 300, by using the transmission time of the RTT-related packet and the reception time of the RTT-related packet. According to an embodiment, the processor 170 may determine the distance from the second external electronic device 300 by using the RTT.

For the purpose of determining the position of the first external electronic device 200 using the TDOA, the position of the second external electronic device 300 needs to be specified. The processor 170 may verify the distance of the second external electronic device 300 by using the RTT, but may not verify the direction in which the second external electronic device 300 is located. As such, for the purpose of specifying the direction of the second external electronic device 300, the processor 170 may display a user interface that directs the direction of the second external electronic device 300 in a specific direction on the display 150. This will be described with reference to FIG. 8.

According to an embodiment, the processor 170 may determine the direction of the first external electronic device 200 by using a distance corresponding to the reception time difference between wireless communication signals received from the electronic device 100 and the second external electronic device 300 and the position of the second external electronic device 300.

According to an embodiment, the processor 170 may measure the RSS of the wireless communication signal received from the first external electronic device 200, by using the communication module 120 (e.g., the BT module 121). According to an embodiment, the processor 170 may determine the change in the distance from the first external electronic device 200, by using the RSS. For example, when the RSS increases, the processor 170 may determine that the distance from the first external electronic device 200 is getting closer; when the RSS decreases, the processor 170 may determine that the distance from the first external electronic device 200 is getting farther away.

According to an embodiment, the processor 170 may determine the distance from the first external electronic device 200, by using RTT measured by the communication module 120 (e.g., the Wi-Fi module 123). For example, the processor 170 may determine the distance from the first external electronic device 200 by using the RTT and the propagation speed of the wireless communication signal in the air.

Figure 7:
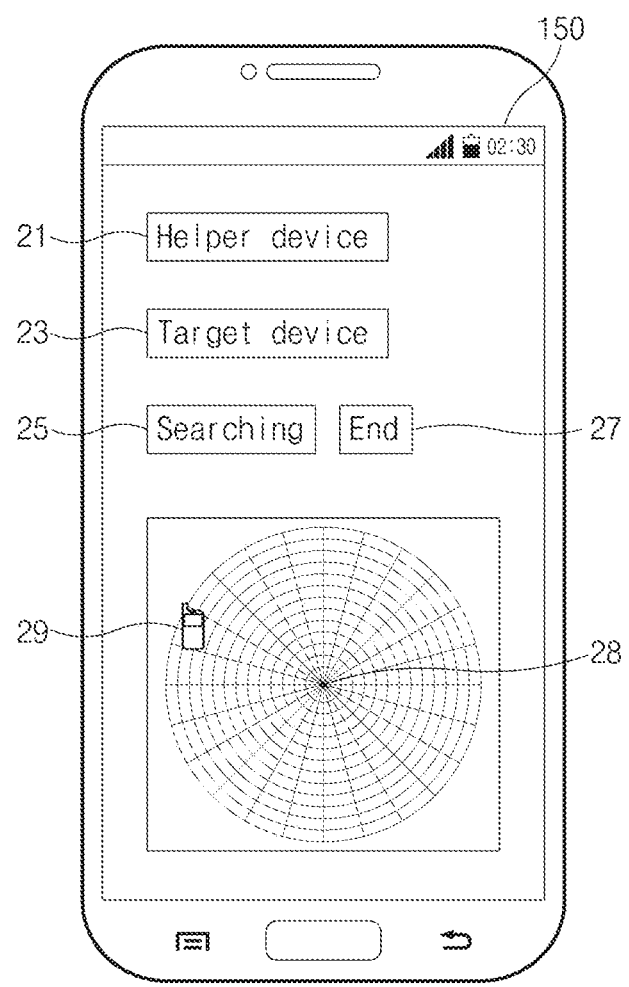
FIG. 7 is a view illustrating a user interface, according to various embodiments of the present disclosure.

FIG. 7 is a view illustrating a user interface, according to various embodiments of the present disclosure.

Referring to FIG. 7, a user interface may include a first object 21 for selecting the second external electronic device 300, a second object 23 for selecting the first external electronic device 200, a third object 25 for finding the position of the first external electronic device 200, and a fourth object 27 that terminates an operation of finding the position of the first external electronic device 200. For example, a user may select the first external electronic device 200 and the at least one second external electronic device 300 by using the first object 21 and the second object 23.

The device information of the first external electronic device 200 may be stored in the memory 160 in advance. For example, information about the first external electronic device 200 may be registered through an application by the user in advance and then may be stored in the memory 160. For example, when the second object 23 is selected by the user, the processor 170 may provide the list of the first external electronic device 200 stored in the memory 160, and the user may select one of electronic devices included in the list as the first external electronic device 200.

The second external electronic device 300 may be an electronic device capable of communicating with the electronic device 100 through a short range communication scheme (e.g., BT, BLE, Wi-Fi, or the like). For example, when the first object 21 is selected by the user, the processor 170 may provide a list of second external electronic devices capable of communicating at a periphery of the electronic device 100, and the user may select at least part of the second external electronic devices included in the list, as the second external electronic device 300.

According to an embodiment, when the third object 25 is selected after the selection of the first external electronic device 200 and the at least one second external electronic device 300 is completed, the operation of finding the position of the first external electronic device 200 may be started. According to an embodiment, when the fourth object 27 is selected while the operation of finding the position is performed, the operation of finding the position of the first external electronic device 200 may be terminated.

Referring to FIG. 7, a user interface may include a fifth object 29 indicating the position of the first external electronic device 200. For example, according to an embodiment, when the position of the first external electronic device 200 is determined, the processor 170 may display the position (e.g., a direction or a distance) of the first external electronic device 200 on the display 150. The processor 170 may display the relative position of the first external electronic device 200 based on the electronic device 100 or may display the absolute positions of the electronic device 100 and the first external electronic device 200 on a map. For example, referring to FIG. 7, the processor 170 may display the fifth object 29 indicating the relative position of the first external electronic device 200 based on a reference point 28 indicating the position of the electronic device 100. According to an embodiment, when the distance from the first external electronic device 200 is determined or when the distance is changed, the processor 170 may display the fifth object 29 in proportion to the distance from the first external electronic device 200. For example, as the distance from the first external electronic device 200 increases, the processor 170 may display the fifth object 29 to be farther from the reference point 28; as the distance from the first external electronic device 200 decreases, the processor 170 may display the fifth object 29 to be closer to the reference point 28. According to an embodiment, the processor 170 may periodically update and display the position of the fifth object 29.

Figure 8:
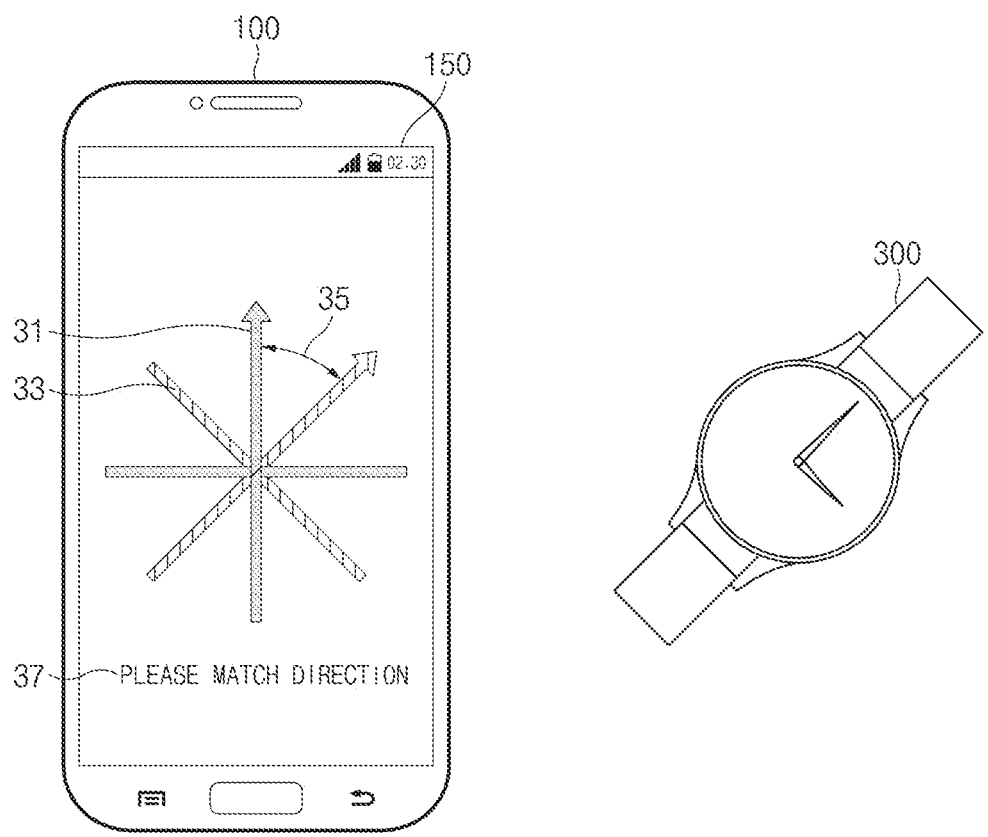
FIG. 8 is a view illustrating a user interface, according to various embodiments of the present disclosure.

FIG. 8 is a view illustrating a user interface, according to various embodiments of the present disclosure.

According to an embodiment, the processor 170 of the electronic device 100 may display a user interface for matching the direction of the electronic device 100 with the direction of the second external electronic device 300, on the display 150. The processor 170 may display the user interface for matching the direction, when the direction of the electronic device 100 is different from the direction of the second external electronic device 300.

Referring to FIG. 8, the user interface may include an object 31 indicating the direction of the electronic device 100, and an object 33 indicating the direction of the second external electronic device 300.

According to an embodiment, the processor 170 may share direction information with the second external electronic device 300 through the communication module 120. According to an embodiment, the processor 170 may update the first object 31 and the second object 33 so as to correspond to the changed direction when directions of the electronic device 100 and the second external electronic device 300 are changed.

Referring to FIG. 8, the user interface may include a third object 35 indicating that the direction of the electronic device 100 does not coincide with the direction of the second external electronic device 300. According to an embodiment, the processor 170 may change at least one of a shape, a color, and a size of the third object 35 depending on the difference between the direction of the electronic device 100 and the direction of the second external electronic device 300. For example, as the difference between the direction of the electronic device 100 and the direction of the second external electronic device 300 decreases, the processor 170 may allow the third object 35 to be transparent or may allow the third object 35 to be small.

Referring to FIG. 8, the user interface may include a fourth object 37 for matching the direction of the electronic device 100 with the direction of the second external electronic device 300. According to an embodiment, the fourth object 37 may include a text, a graphic image, or the like for matching the direction.

Figure 9:
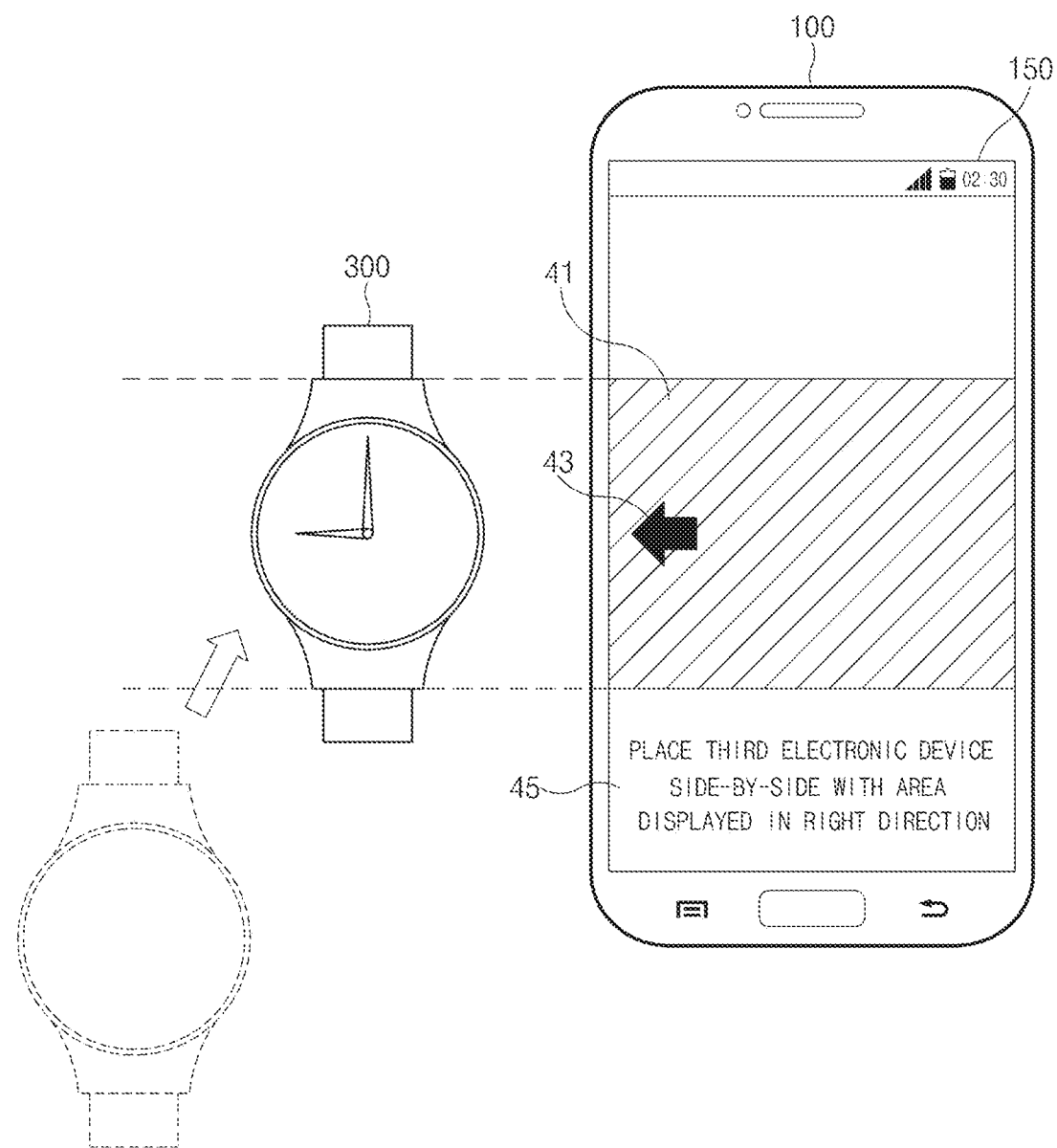
FIG. 9 is a view illustrating a user interface, according to various embodiments of the present disclosure.

FIG. 9 is a view illustrating a user interface, according to various embodiments of the present disclosure.

According to an embodiment, for the purpose of specifying the direction of the second external electronic device 300, the processor 170 may display a user interface that directs the direction of the second external electronic device 300 in a specific direction on the display 150.

Referring to FIG. 9, a user interface may include an area 41 for specifying the position of the second external electronic device 300 in a vertical (or longitudinal) direction of the electronic device 100 and an object 43 for specifying the position of the second external electronic device 300 in a horizontal (or latitudinal) direction of the electronic device 100. According to an embodiment, the user interface may include a text object 45 that directs the second external electronic device 300 to be located in a specific direction.

Figure 10:
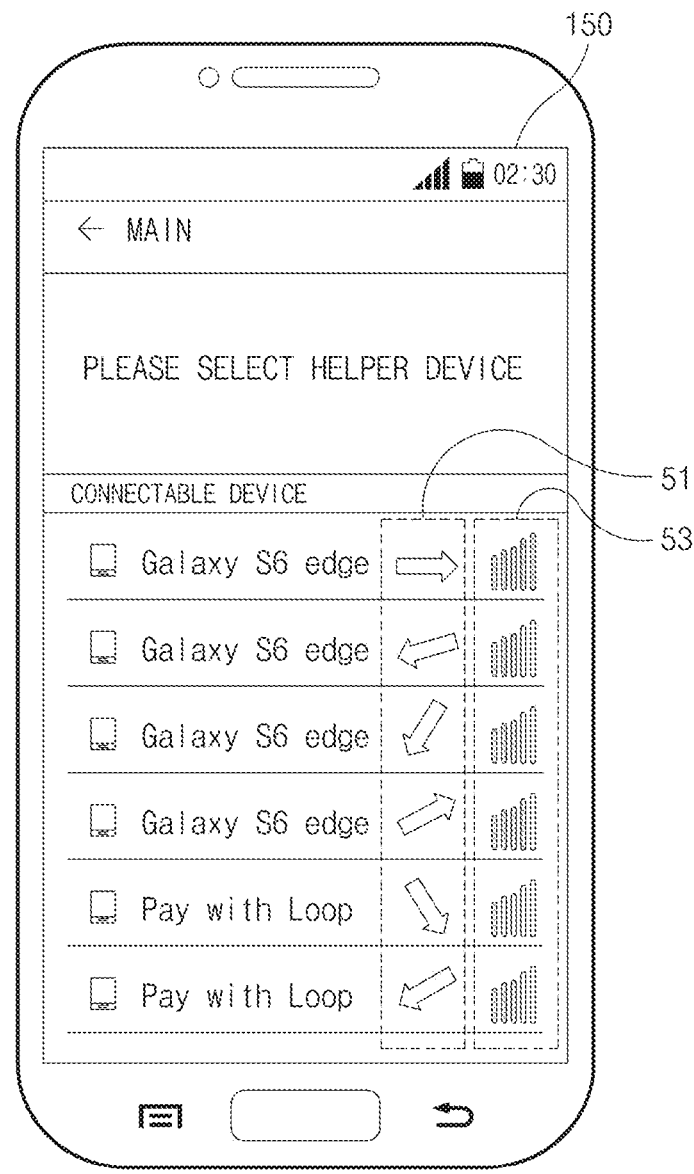
FIG. 10 is a view illustrating a user interface, according to various embodiments of the present disclosure.

FIG. 10 is a view illustrating a user interface, according to various embodiments of the present disclosure.

According to an embodiment, the processor 170 of the electronic device 100 may search for an external electronic device (e.g., a device including a BT or Wi-Fi communication function) located at a periphery of the electronic device 100, by using the communication module 120 (e.g., the BT module 121 or the Wi-Fi module 123). For example, when the first object 21 of FIG. 7 is selected by a user, the processor 170 may display a user interface indicating the direction and signal strength of the second external electronic device 300 at a periphery of the electronic device 100, on the display 150.

According to an embodiment, when searching for peripheral devices to connect to BT or Wi-Fi, the processor 170 may determine the direction and RSS of each of the peripheral devices by using wireless communication signals (e.g., a probe response signal) received from the peripheral devices.

Referring to FIG. 10, the user interface displayed on the display 150 may include an object 51 indicating the direction in which the at least one or more second external electronic devices 300 located at a periphery of an electronic device are located, and an object 53 indicating signal strength. When a user searches for the second external electronic device 300 located at a periphery of the electronic device 100, a BT device having the same name may be present. The user may select a specific device, which is to be connected, from among a plurality of devices having the same name with reference to the objects 51 and 53 displayed on a display.

Figure 11:
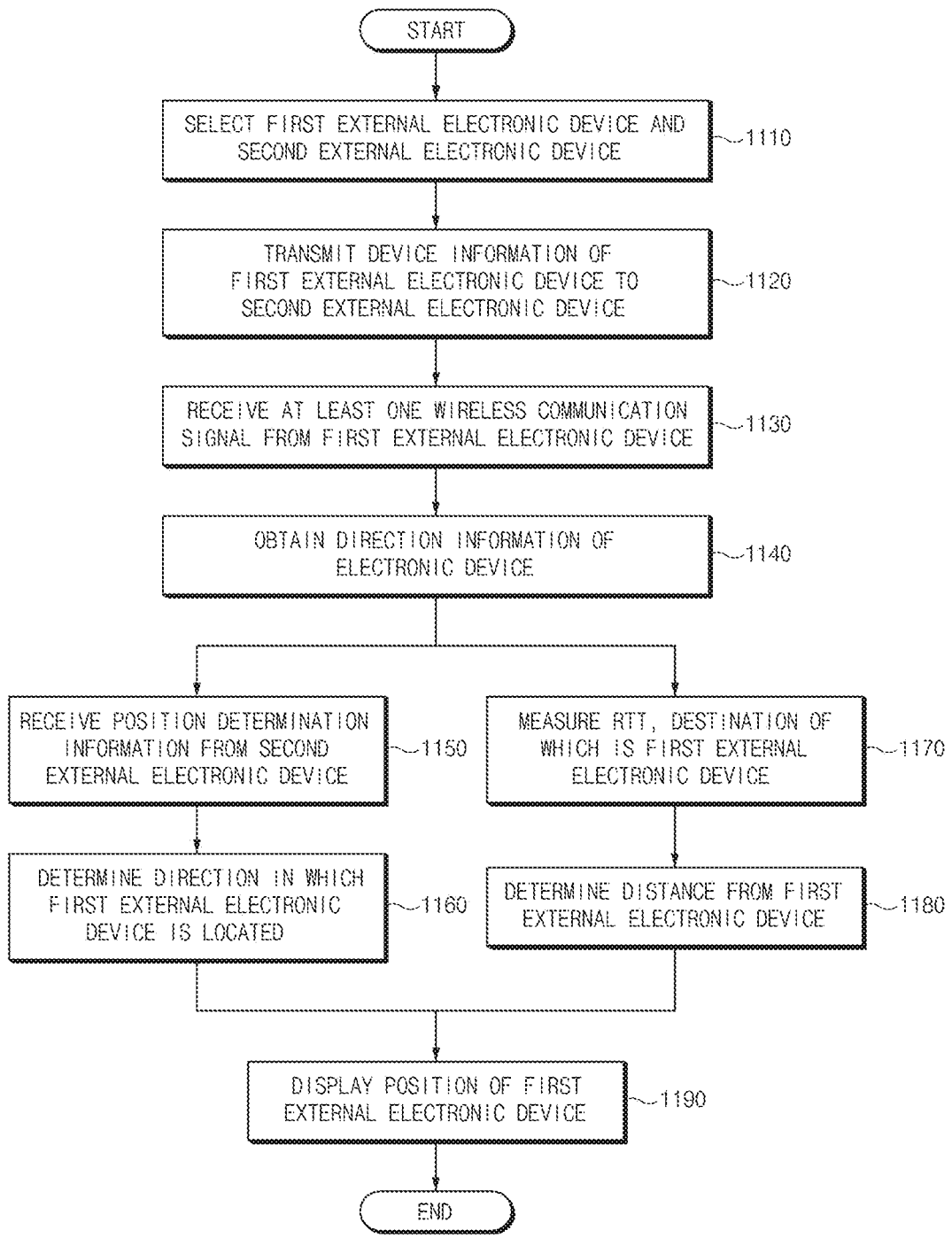
FIG. 11 is a flowchart illustrating a position determination method of an electronic device, according to various embodiments of the present disclosure.

FIG. 11 is a flowchart illustrating a position determination method of an electronic device, according to various embodiments of the present disclosure.

A flowchart shown in FIG. 11 may include operations processed in the electronic device 100 shown in FIG. 5. Even though omitted below, information about the electronic device 100 described with reference to FIGS. 1 to 10 may be applied to the flowchart illustrated in FIG. 11.

According to an embodiment, in operation 1110, the electronic device 100 (e.g., the processor 170) may select the first external electronic device 200 and the second external electronic device 300. According to an embodiment, the electronic device 100 may select the first external electronic device 200 and the second external electronic device 300 depending on a user input. For example, a user may select the first external electronic device 200 and the at least one second external electronic device 300 by using a user interface provided by an application (e.g., a position finding application). According to an embodiment, in the case where a user of the electronic device 100 is the same as a user of the second external electronic device 300 or in the case where the preregistered second external electronic device 300 is present, the processor 170 may select the corresponding device without a user input.

According to an embodiment, in operation 1120, the electronic device 100 (e.g., the communication module 120) may transmit device information of the first external electronic device 200 to the second external electronic device 300. For example, the device information may be the BT address, a BLE identifier (ID), or a media access control (MAC) address of the first external electronic device 200. According to an embodiment, the electronic device 100 may additionally make a request for at least one piece of received wireless communication signal information and the direction information of the second external electronic device 300 to the second external electronic device 300.

According to an embodiment, in operation 1130, the electronic device 100 (e.g., the communication module 120) may receive at least one wireless communication signal from the first external electronic device 200. For example, the electronic device 100 may receive the wireless communication signal corresponding to the number of antennas. For example, the wireless communication signal may be a BLE beacon signal.

According to an embodiment, in operation 1140, the electronic device 100 (e.g., the sensor module 130) may obtain the direction information (e.g., orientation information) of the electronic device 100. For example, the electronic device 100 may measure azimuth by using a sensor module (e.g., a geomagnetic sensor).

According to an embodiment, in operation 1150, the electronic device 100 (e.g., the communication module 120) may receive position determination information from the second external electronic device 300. According to an embodiment, the electronic device 100 may receive wireless communication signal information received by the second external electronic device 300 from the first external electronic device 200, RF pattern information of an antenna included in the second external electronic device 300, and direction information of the second external electronic device 300, from the second external electronic device 300 through the communication module 120. According to an embodiment, the electronic device 100 may receive position information (e.g., position information determined based on the second external electronic device 300) of the first external electronic device 200 determined based on wireless communication signal information and the direction information of the second external electronic device 300, from the second external electronic device 300 through the communication module 120. According to an embodiment, the electronic device 100 may receive position information (e.g., position information determined based on the electronic device 100) of the first external electronic device 200 corrected based on direction information of each of the electronic device 100 and the second external electronic device 300 from the second external electronic device 300 through the communication module 120.

According to an embodiment, in operation 1160, the electronic device 100 (e.g., the processor 170) may determine a direction in which the first external electronic device 200 is located. For example, the electronic device 100 may determine the direction in which the first external electronic device 200 is located, based on the electronic device 100. According to an embodiment, the electronic device 100 may determine the direction in which the first external electronic device 200 is located, by using at least one of angle of arrival (AOA), RF pattern matching, TOA, or TDOA. The method in which the electronic device 100 determines the position of the first external electronic device 200 has been described in detail with reference to FIG. 6, and thus a detailed description thereof is omitted.

According to an embodiment, in operation 1170, the electronic device 100 (e.g., the communication module 120) may measure RTT, the destination of which is the first external electronic device 200. For example, the electronic device 100 may transmit an RTT-related packet to the first external electronic device 200 and may receive the RTT-related packet from the first external electronic device 200. According to an embodiment, the electronic device 100 may measure the RTT based on the transmission time of the RTT-related packet and reception time of the RTT-related packet.

According to an embodiment, in operation 1180, the electronic device 100 (e.g., the processor 170) may determine the distance from the first external electronic device 200. For example, the electronic device 100 may determine the distance from the first external electronic device 200 by using the RTT.

According to an embodiment, in operation 1190, the electronic device 100 (e.g., the processor 170) may display the position (e.g., a direction and a distance) of the first external electronic device 200 on a display. For example, the electronic device 100 may display the position of the first external electronic device 200 by using a user interface provided by an application.

Figure 12:
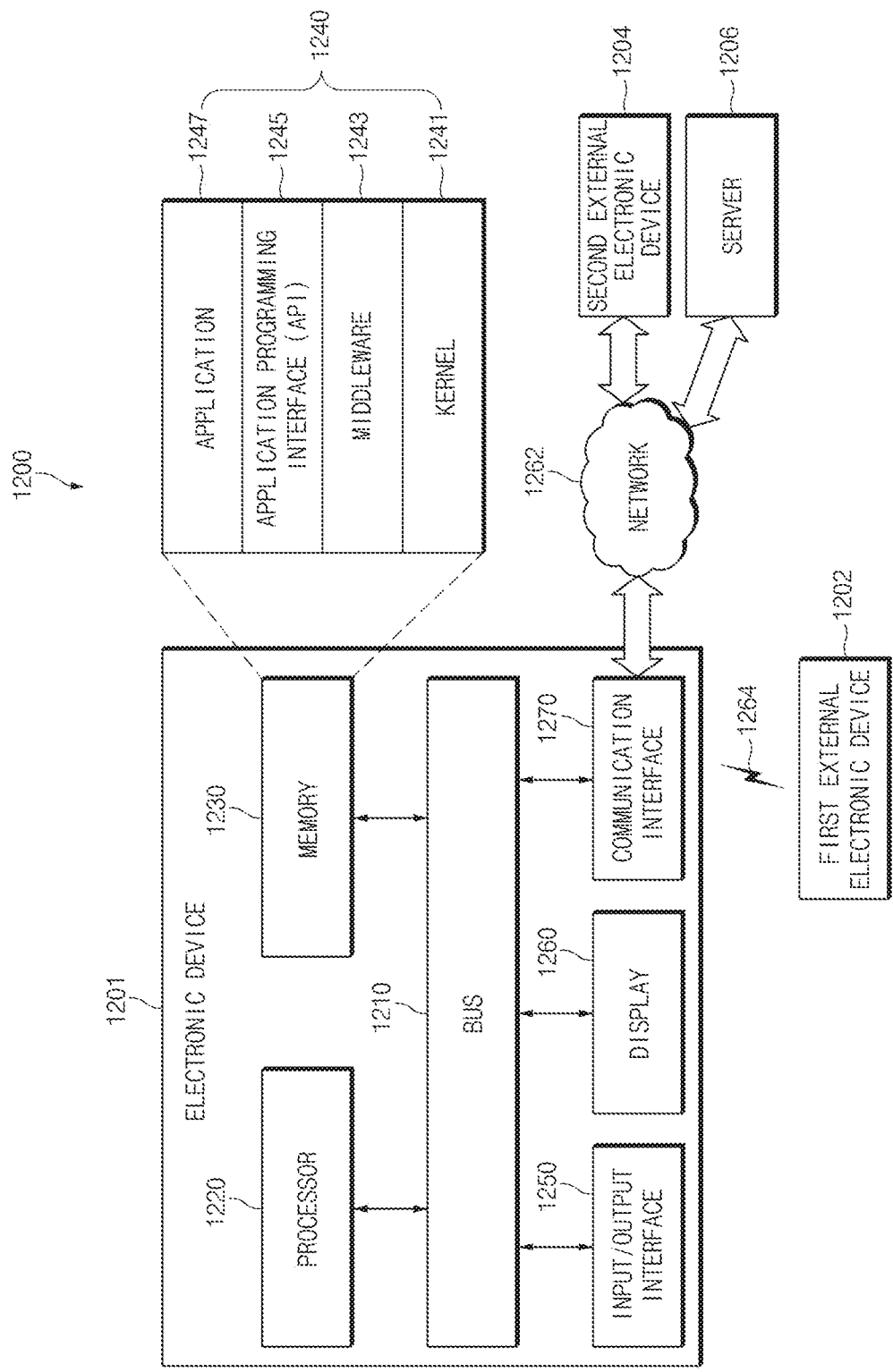
FIG. 12 is a block diagram of an electronic device in a network environment, according to various embodiments.

FIG. 12 illustrates an electronic device in a network environment, according to various embodiments.

Referring to FIG. 12, according to various embodiments, an electronic device 1201 in a network environment will be described. For example, the electronic device 1201 may include all or part of the electronic device 100 illustrated in FIG. 5. The electronic device 1201 may include a bus 1210, a processor 1220, a memory 1230, an input/output interface 1250, a display 1260, and a communication interface 1270. According to an embodiment, the electronic device 1201 may not include at least one of the above-described components or may further include other component(s).

For example, the bus 1210 may interconnect the above-described components 1210 to 1270 and may include a circuit for conveying communications (e.g., a control message and/or data) among the above-described components.

The processor 1220 may include one or more of a central processing unit (CPU), an application processor (AP), or a communication processor (CP). For example, the processor 1220 may perform an arithmetic operation or data processing associated with control and/or communication of at least other components of the electronic device 1201.

The memory 1230 may include a volatile and/or nonvolatile memory. For example, the memory 1230 may store commands or data associated with at least one other component(s) of the electronic device 1201. According to an embodiment, the memory 1230 may store software and/or a program 1240.

The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete components of the electronic device 1201 so as to control or manage system resources.

The middleware 1243 may perform, for example, a mediation role such that the API 1245 or the application program 1247 communicates with the kernel 1241 to exchange data. Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247 to process the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, of an interface which transmits a command or data input from a user or another external device, to other component(s) of the electronic device 1201. Furthermore, the input/output interface 1250 may output a command or data, received from other component(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first electronic device 1202 (e.g., the first external electronic device 200), the second electronic device 1204 (e.g., the second external electronic device 300), or the server 1206). For example, the communication interface 1270 may be connected to the network 1262 over wireless communication or wired communication to communicate with the external device (e.g., the second external electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1264. The short range communication 1264 may include at least one of wireless fidelity (Wi-Fi), Bluetooth, near field communication (NFC), magnetic stripe transmission (MST), a global navigation satellite system (GNSS), or the like. The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used.

The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the first external electronic device 1202, the second external electronic device 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 from another device (e.g., the external electronic device 1202 or 1204 or the server 1206). The other electronic device (e.g., the first or second external electronic device 1202 or 1204 or the server 1206). may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
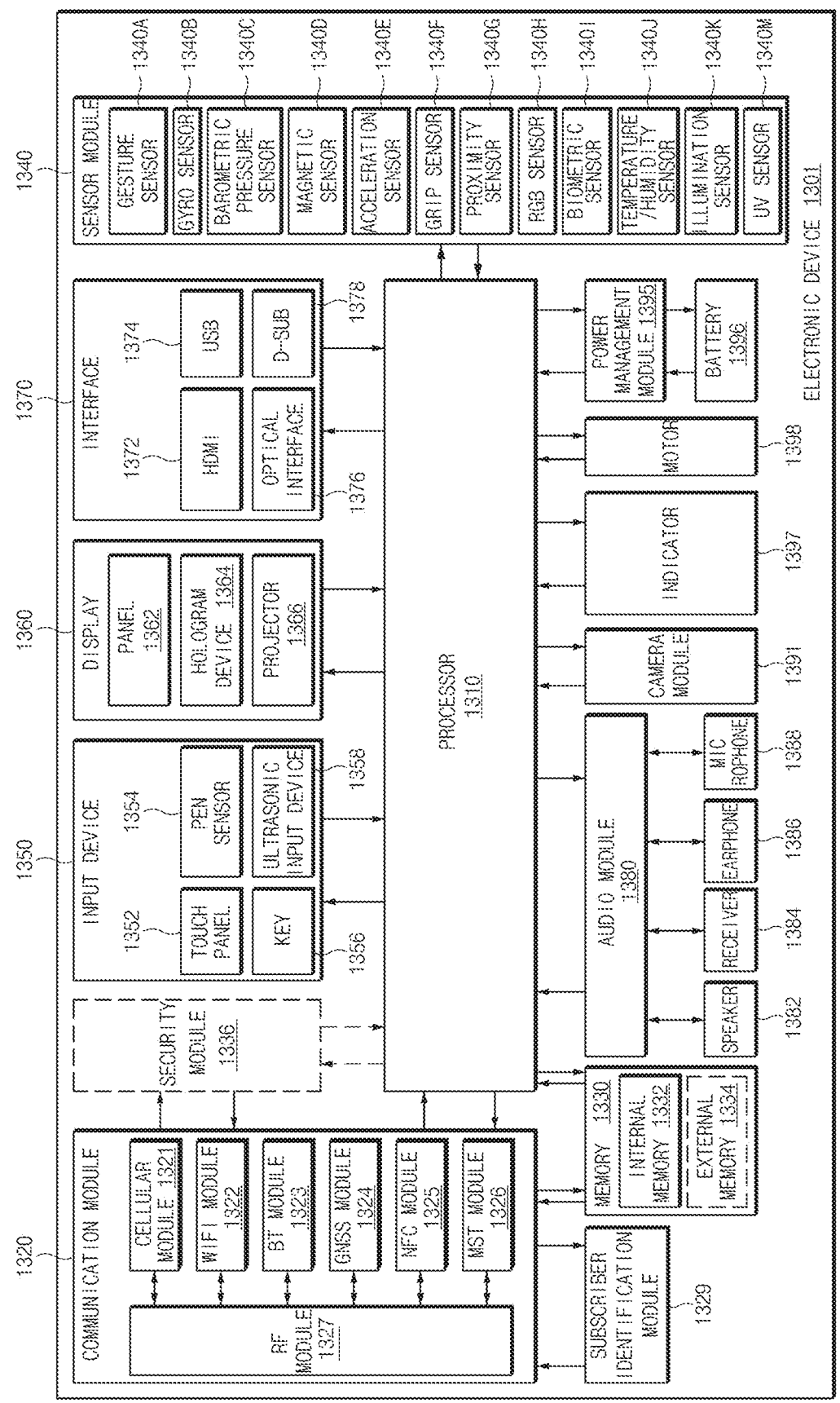
FIG. 13 is a block diagram illustrating an electronic device, according to various embodiments of the present disclosure.

FIG. 13 is a block diagram illustrating an electronic device, according to various embodiments.

An electronic device 1301 may include, for example, all or a part of the electronic device 100 illustrated in FIG. 5. The electronic device 1301 may include one or more processors (e.g., an application processor (AP)) 1310, a communication module 1320, a subscriber identification module 1329, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software components connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of components illustrated in FIG. 13. The processor 1310 may load a command or data, which is received from at least one of other components (e.g., a nonvolatile memory), into a volatile memory and process the loaded command or data. The processor 1310 may store a variety of data in the nonvolatile memory.

The communication module 1320 may be configured the same as or similar to the communication interface 1270 of FIG. 12. The communication module 1320 may include the cellular module 1321, a Wi-Fi module 1322, a Bluetooth (BT) module 1323, a GNSS module 1324 (e.g., a GPS module, a Glonass module, a Beidou module, or a Galileo module), a near field communication (NFC) module 1325, a MST module 1326 and a radio frequency (RF) module 1327.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1329. According to an embodiment, the cellular module 1321 may perform at least a portion of functions that the processor 1310 provides. According to an embodiment, the cellular module 1321 may include a communication processor (CP).

Each of the Wi-Fi module 1322, the BT module 1323, the GNSS module 1324, the NFC module 1325, or the MST module 1326 may include a processor for processing data exchanged through a corresponding module, for example. According to an embodiment, at least a part (e.g., two or more) of the cellular module 1321, the Wi-Fi module 1322, the BT module 1323, the GNSS module 1324, the NFC module 1325, or the MST module 1326 may be included within one Integrated Circuit (IC) or an IC package.

For example, the RF module 1327 may transmit and receive a communication signal (e.g., an RF signal). For example, the RF module 1327 may include a transceiver, a power amplifier module (PAM), a frequency filter, a low noise amplifier (LNA), an antenna, or the like. According to another embodiment, at least one of the cellular module 1321, the Wi-Fi module 1322, the BT module 1323, the GNSS module 1324, the NFC module 1325, or the MST module 1326 may transmit and receive an RF signal through a separate RF module.

The subscriber identification module 1329 may include, for example, a card and/or embedded SIM that includes a subscriber identification module and may include unique identify information (e.g., integrated circuit card identifier (ICCID)) or subscriber information (e.g., integrated mobile subscriber identity (MI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

A security module 1336 may be a module that includes a storage space of which a security level is higher than that of the memory 1330 and may be a circuit that guarantees safe data storage and a protected execution environment. The security module 1336 may be implemented with a separate circuit and may include a separate processor. For example, the security module 1336 may be in a smart chip or a secure digital (SD) card, which is removable, or may include an embedded secure element (eSE) embedded in a fixed chip of the electronic device 1301. Furthermore, the security module 1336 may operate based on an operating system (OS) that is different from the OS of the electronic device 1301. For example, the security module 1336 may operate based on java card open platform (JCOP) OS. The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or alternatively, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal. According to an embodiment, the touch panel 13352 may include a pressure sensor (or force sensor, interchangeably used hereinafter) that measures the intensity of touch pressure by a user. The pressure sensor may be implemented integrally with the touch panel 1352, or may be implemented as at least one sensor separately from the touch panel 1352.

The display 1360 may include a panel 1362, a hologram device 1364, or a projector 1366. The panel 1362 may be implemented, for example, to be flexible, transparent or wearable. The panel 1362 and the touch panel 1352 may be integrated into a single module. According to an embodiment, the panel 1362 may include a pressure sensor (or a "force sensor") capable of measuring the intensity of pressure on the touch of the user. The pressure sensor may be integrated with the touch panel 1352 or may be implemented with one or more sensors that are independent of the touch panel 1352. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFlo™, or the like.

Figure 14:
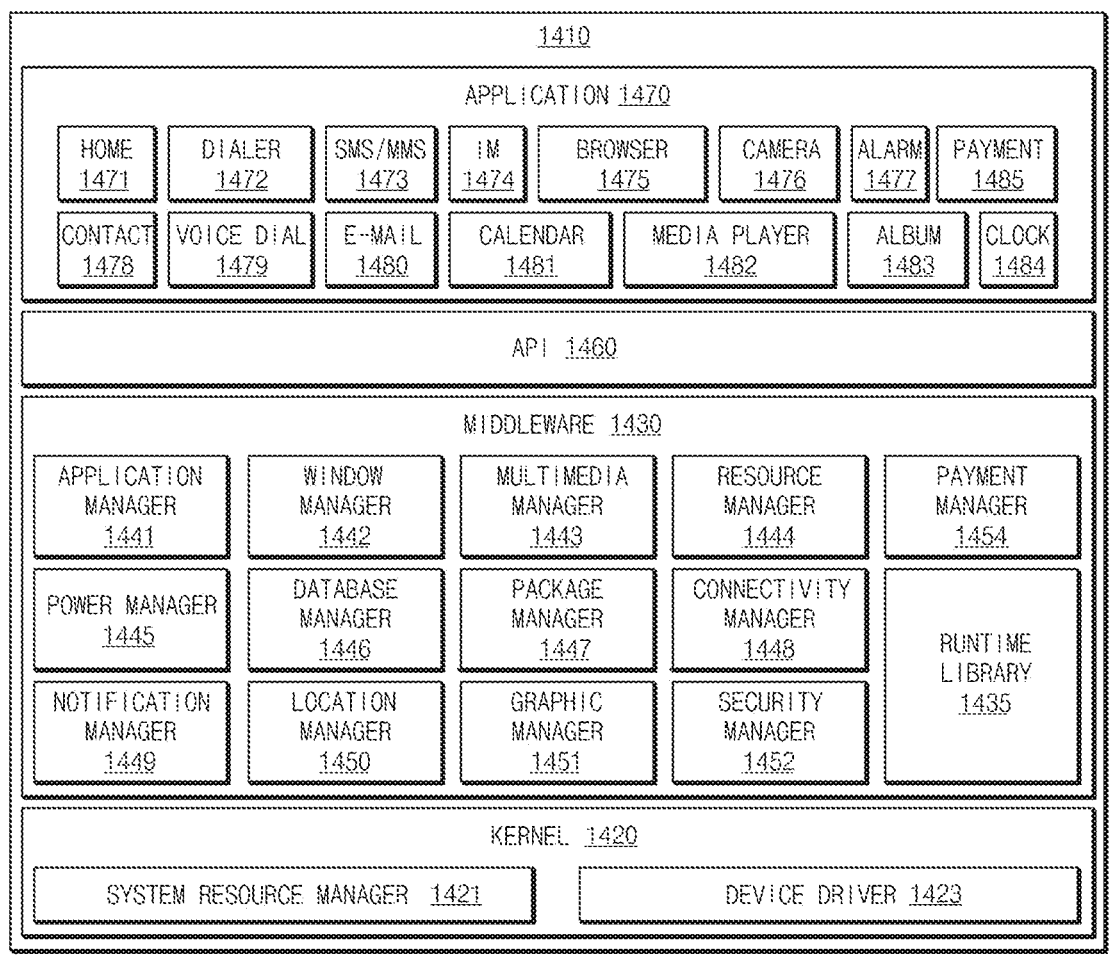
FIG. 14 is a block diagram of a program module, according to various embodiments.

FIG. 14 illustrates a block diagram of a program module, according to various embodiments.

According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android™ (OS™), Windows™, Symbian™, Tizen™, or Bada™.

The program module 1410 may include a kernel 1420, a middleware 1430, an application programming interface (API) 1460, and/or an application 1470. At least a portion of the program module 1410 may be preloaded on an electronic device or may be downloadable from an external electronic device (e.g., the first external electronic device 1202, the second external electronic device 1204, the server 1206, or the like).

The kernel 1420 (e.g., the kernel 1241) may include, for example, a system resource manager 1421 or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage, for example, wireless connection such as Wi-Fi or Bluetooth. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described components. The middleware 1430 may provide a module specialized to each OS kind to provide differentiated functions. Additionally, the middleware 1430 may dynamically remove a part of the preexisting components or may add new components thereto.

The API 1460 (e.g., the API 1245) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, a timepiece 1484, and a payment 1485 or for offering health care (e.g., measuring an exercise quantity, blood sugar, or the like) or environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the first electronic device 1202 or the second electronic device 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the first external electronic device 1202 or the second external electronic device 1204). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the first external electronic device 1202 or the second external electronic device 1204) which communicates with the electronic device (e.g., the external electronic device 1201), an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device (e.g., the first external electronic device 1202 or the second external electronic device 1204). According to an embodiment, the application 1470 may include an application that is received from an external electronic device (e.g., the first external electronic device 1202, the second external electronic device 1204, or the server 1206). According to an embodiment, the application 1470 may include a preloaded application or a third party application that is downloadable from a server. The names of components of the program module 1410 according to the embodiment may be modifiable depending on kinds of operating systems.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 170 of FIG. 5). At least a portion of the program module 1410 may include, for example, modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1220), may cause the one or more processors to perform a function corresponding to the instruction. The computer-readable storage media, for example, may be the memory 160.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

The invention claimed is:

1. An electronic device comprising:
a communication module;
a sensor module configured to sense a direction of the electronic device;
an input module; and
a processor,
wherein the processor is configured to:
when a user input to select a first external electronic device and a second external electronic device is received, transmit device information of the first external electronic device to the second external electronic device through the communication module;
request direction information of the first external electronic device determined based on the second external electronic device and direction information of the second external electronic device;
receive at least one wireless communication signal from a first external electronic device through the communication module;

determine a direction of the first external electronic device based on the electronic device by using information about the wireless communication signal;

obtain direction information of the electronic device by using the sensor module;

receive the direction information of the first external electronic device determined based on the second external electronic device and the direction information of the second external electronic device, from the second external electronic device; and determine a position of the first external electronic device by using the direction information of the first external electronic device determined based on the electronic device, the direction information of the electronic device, the direction information of the first external electronic device determined based on the second external electronic device, and the direction information of the second external electronic device.

2. The electronic device of claim 1, wherein the information about the wireless communication signal includes at least one of phase information, reception pattern information, reception time information, or received signal strength (RSS) of the wireless communication signal.

3. The electronic device of claim 1, wherein the processor is configured to:

correct the direction of the first external electronic device, which is determined based on the second external electronic device, based on the electronic device by using the direction information of the electronic device and the direction information of the second external electronic device.

4. The electronic device of claim 1, wherein the direction information is azimuth information.

5. The electronic device of claim 1, wherein the processor is configured to:

measure round trip time (RTT), a destination of which is the first external electronic device, through the communication module; and determine a distance from the first external electronic device by using the RTT.

6. The electronic device of claim 1, wherein the processor is configured to:

measure RSS of the wireless communication signal received from the first external electronic device, by using the communication module; and determine a change in a distance from the first external electronic device, by using the RSS.

7. The electronic device of claim 1, further comprising:
a display,
wherein the processor is configured to:
when the direction information of the electronic device and the direction information of the second external electronic device are different from each other, display a user interface for matching the direction of the electronic device with a direction of the second external electronic device, on the display.

8. The electronic device of claim 1, further comprising:
a display, and
wherein the processor is configured to:
display a direction, in which the first external electronic device is located, on the display.

9. A position determination method of an electronic device, the method comprising:

receiving a user input to select a first external electronic device and a second external electronic device;

transmitting device information of the first external electronic device to the second external electronic device through the communication module;

requesting direction information of the first external electronic device determined based on the second external electronic device and direction information of the second external electronic device;

receiving at least one wireless communication signal from the first external electronic device through a communication module;

determining a direction of the first external electronic device based on the electronic device by using information about the wireless communication signal;

obtaining direction information of the electronic device by using a sensor module;

receiving the direction information of the first external electronic device determined based on the second external electronic device and the direction information of the second external electronic device, from the second external electronic device; and determining a position of the first external electronic device by using the direction information of the first external electronic device determined based on the electronic device, the direction information of the electronic device, the direction information of the first external electronic device determined based on the second external electronic device, and the direction information of the second external electronic device.

10. The method of claim 9, wherein the determining of the position of the first external electronic device includes:

correcting the direction of the first external electronic device, which is determined based on the second external electronic device, based on the electronic device by using the direction information of the electronic device and the direction information of the second external electronic device.

11. The method of claim 9, wherein the determining of the position of the first external electronic device includes:

measuring RTT, a destination of which is the first external electronic device, through the communication module; and determining a distance from the first external electronic device by using the RTT.

12. The method of claim 9, further comprising:
measuring RSS of the wireless communication signal received from the first external electronic device; and
determining a change in a distance from the first external electronic device, by using the RSS.

13. The method of claim 9, further comprising:
when the direction information of the electronic device and the direction information of the second external electronic device are different from each other, displaying a user interface for matching a direction of the electronic device with a direction of the second external electronic device, on the display.

* * * * *